United States Patent
Dube et al.

(10) Patent No.: US 11,038,850 B2
(45) Date of Patent: Jun. 15, 2021

(54) METHODS OF DISTRIBUTING DIGITAL PUBLICATIONS INCORPORATING USER GENERATED AND ENCRYPTED CONTENT WITH UNIQUE FINGERPRINTS

(71) Applicant: COGNILORE, INC., Gatineau (CA)

(72) Inventors: Andre Dube, Gatineau (CA); Darryl Beallie, Ottawa (CA); Brian Anderson, Nepean (CA); Cody Thompson, Orleans (CA)

(73) Assignee: Cognilore Inc., Gatineau (CA)

( * ) Notice: Subject to any disclaimer, the term of this patent is extended or adjusted under 35 U.S.C. 154(b) by 67 days.

(21) Appl. No.: 15/953,636

(22) Filed: Apr. 16, 2018

(65) Prior Publication Data

US 2018/0234397 A1 Aug. 16, 2018

Related U.S. Application Data

(63) Continuation of application No. 14/384,851, filed as application No. PCT/CA2013/000215 on Mar. 13, 2013, now abandoned.
(Continued)

(51) Int. Cl.
*G06F 21/10* (2013.01)
*G06F 17/30* (2006.01)
(Continued)

(52) U.S. Cl.
CPC .......... *H04L 63/0428* (2013.01); *G06F 16/93* (2019.01); *G06F 21/10* (2013.01);
(Continued)

(58) Field of Classification Search
CPC ... H04L 63/0428; H04L 63/101; H04L 29/06; G06F 16/93; G06F 21/10; G06F 17/30; G06Q 10/10
(Continued)

(56) References Cited

U.S. PATENT DOCUMENTS

| | | | |
|---|---|---|---|
| 8,755,058 B1* | 6/2014 | Jackson | G06F 40/186 358/1.13 |
| 9,892,390 B2* | 2/2018 | Schnell | G06Q 20/1235 |

(Continued)

*Primary Examiner* — Joseph P Hirl
*Assistant Examiner* — Thomas A Gyorfi
(74) *Attorney, Agent, or Firm* — Rosenberg, Klein & Lee

(57) ABSTRACT

Electronic publications are increasingly replacing physical media but to date standards have evolved to mimic these physical media. Accordingly it is beneficial to provide electronic publication software systems and/or software applications to enable new paradigms that provide consumers, authors, publishers, retailers, and others with new models for releasing digital content from editorial and authorship viewpoints; new models for providing digital rights management with licensing, re-assignable rights and the ability to issue sub-rights or issue partial licenses with predetermined validity; new models for publishers to release revised editions, errata, new additions, etc; engaging social network type collaborative behavior within work and private environments with associated content (annotations) to the original release content; and supporting discussion and information dissemination within a wide variety of environments from education to business to book clubs etc. The invention also supports distributing electronic content with fingerprinting allowing unique identification of sources of non-authorised content.

18 Claims, 19 Drawing Sheets

Related U.S. Application Data

(60) Provisional application No. 61/610,066, filed on Mar. 13, 2012, provisional application No. 61/610,068, filed on Mar. 13, 2012.

(51) Int. Cl.
*H04L 29/06* (2006.01)
*G06Q 10/10* (2012.01)
*G06F 16/93* (2019.01)

(52) U.S. Cl.
CPC .......... *G06Q 10/10* (2013.01); *H04L 63/101* (2013.01); *H04L 2463/101* (2013.01)

(58) Field of Classification Search
USPC ............................ 713/168, 150; 726/1–6, 19
See application file for complete search history.

(56) References Cited

U.S. PATENT DOCUMENTS

| | | | | |
|---|---|---|---|---|
| 2004/0260929 | A1* | 12/2004 | Albornoz | G06F 16/907 713/176 |
| 2005/0099498 | A1* | 5/2005 | Lao | H04N 5/765 348/207.99 |
| 2006/0004856 | A1* | 1/2006 | Shen | G06F 8/24 |
| 2011/0030065 | A1* | 2/2011 | Kulakowski | H04N 21/6334 726/26 |
| 2014/0289515 | A1* | 9/2014 | Sorotokin | G06F 21/10 713/162 |

* cited by examiner

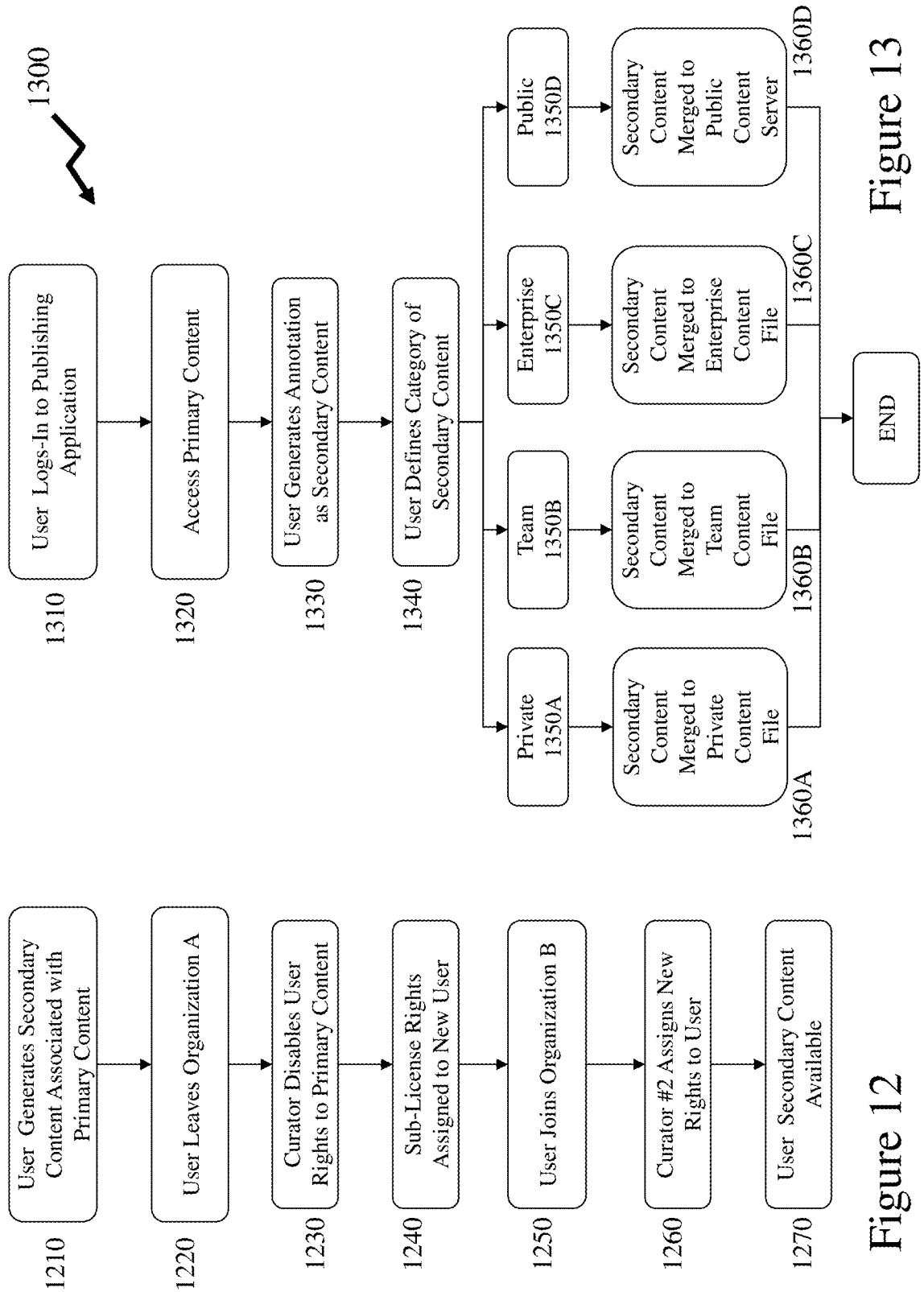

METHODS OF DISTRIBUTING DIGITAL PUBLICATIONS INCORPORATING USER GENERATED AND ENCRYPTED CONTENT WITH UNIQUE FINGERPRINTS

CROSS-REFERENCE TO RELATED APPLICATIONS

This patent application claims the benefit of priority from U.S. patent application Ser. No. 14/384,851 filed Sep. 12, 2014 entitled "Method of Distributing Digital Publications incorporating User Generated and Encrypted Content with Unique Fingerprints", which itself claims the benefit of priority from World International Patent Application PCT/CA2013/000215 filed Mar. 13, 2013 entitled "Method of Distributing Digital Publications incorporating User Generated and Encrypted Content with Unique Fingerprints", which itself claims priority from U.S. Provisional Patent Application U.S. 61/610,066 filed Mar. 13, 2012 entitled "Methods and Systems for Digital Content" and U.S. Provisional Patent Application U.S. 61/610,068 filed Mar. 13, 2012 entitled "Methods and Systems for Digital Content", the entire contents of all being included by reference.

FIELD OF THE INVENTION

The present invention relates to electronic content and more specifically to licensing, annotating, publishing, generating, rendering, and social community engagement of electronic content.

BACKGROUND OF THE INVENTION

In 2010, Google estimated that since the invention of printing, approximately 130,000,000 unique titles had been published. When writing systems were invented in ancient civilizations, approximately 6,000 years ago, words were not separated from each other (scriptural continua) and there was no punctuation and employed various media including tree bark, clay, stone, and metal. Texts were written from right to left, left to right, and even so that alternate lines read in opposite directions. Today, many languages including Japanese, Hebrew, Arabic, and Chinese remain as right-to-left languages whereas those derived from the Greek, Latin and Cyrillic languages are left-to-right. Additionally, Chinese and Japanese are read bottom-to-top whereas Hebrew, Arabic, and those derived from Greek, Latin and Cyrillic languages are top-to-bottom. Accordingly, even today there are multiple structures for text even ignoring the 82 languages with over 10 million native speakers and the 7,358 recognised languages ("Ethnologue: Languages of the World").

Since the early-20th century to today the majority of books are printed by offset lithography although the introduction in the late-20th century of computer-to-file and computer-to-plate systems further increased quality as well as allowing electronic distribution of content from a publisher to the printer. These technologies led to publishing concepts such as "print on demand", which make it possible to print as few as one book at a time, have made self-publishing much easier and more affordable whilst also allowing publishers to keep low-selling books in print rather than declaring them out of print. Also, in the late 20th Century the combination of advanced word processing software, graphic image processing software, and standards for document exchange combined with the rapid penetration of the Internet resulted in much of the new information generated not being printed in paper books but being available online through websites, digital libraries, CD/DVD/NAND ROM, or in the form of eBooks. Additionally, the Internet has resulted in a rapid proliferation of information and written content overall despite erosion generally in writing skills of users of the Internet. An on-line book is an electronic book that is available online through the Internet whereas, at present, an eBook, being a contraction of "electronic book", refers to a digital version of a conventional print book although with time these distinctions will be lost. Today the majority of content on the Internet is presented through extendable markup languages such as Extensible Markup Language (XML) and Hypertext Markup Language (HTML) which control their appearance within webpages and web sites.

Numerous eBook formats have emerged and proliferated over the past twenty years for electronic publishing (ePublishing), some supported by major software companies such as Adobe with its Portable Document Format (PDF) approach, and others supported by independent and open-source programmers including EPUB (also referred to as ePUB, ePub, EPub, and epub) which became an official standard of the International Digital Publishing Forum (IDPF) in 2007 superseding the older Open eBook standard. Today the vast majority of downloadable content from the Internet is PDF based.

EPUB has become a leading format for eBooks alongside PDF as it is free and open, supports re-flowable (word wrap) and re-sizable text, supports inline raster and vector images, allows embedded metadata, Cascading Style Sheets (CSS) styling, alternative renditions in the same file, use of out-of-line and inline Extensible Markup Language (XML) islands (an XML island is a piece of XML embedded within an HTML document to associate data with an HTML object to extend the functionality of the HTML). However, EPUB does not support Digital Rights Management (DRM) directly and such functionality is typically applied through applying "wrappers" such as Adobe's Content Server approach to provide an equivalent function as the "wrapper" is encrypted/decrypted by the supporting eReader software thereby exposing the EPUB for display.

Like EPUB PDF is an open standard for document exchange. However, unlike EPUB, PDF was originally a proprietary format controlled by Adobe for representing documents in a manner independent of application software, hardware, and operating systems. It was officially released as an open standard in 2008 and published by the International Organization for Standardization (ISO) as ISO 32000-1:2008. At the same time Adobe published a Public Patent License to ISO 32000-1 granting a royalty-free rights for all patents owned by Adobe that are necessary to make, use, sell and distribute PDF compliant implementations. Each PDF file encapsulates a complete description of a fixed-layout flat document, including the text, fonts, graphics, and other information needed to display it. Accordingly, PDF documents are fixed in layout and do not reflow according to the rendering device's screen dimensions or orientation as EPUB does. Other standards in addition to PDF and EPUB are also employed including, for example, the AZW and MOBI eBook formats.

In contrast to the fully self-contained PDF an EPUB file uses XHTML 1.1 to construct the content of a book. Styling and layout are performed using a subset of CSS 2.0 such that this specialized syntax requires only a portion of CSS properties to be supported by e-reading systems and adds a few custom properties such as page-header and page footer. EPUB also requires that PNG, JPEG, GIF, and SVG images be supported using Multipurpose Internet Mail Extensions (MIME) and whilst other media types are allowed, creators must include alternative renditions using supported types. EPUB requires Unicode and content producers must use either UTF-8 or UTF-16 encoding in order for EPUB to support international and multilingual books. However, reading systems are not required to provide the fonts necessary to display every Unicode character, though they are required to display at least a placeholder for characters that cannot be displayed fully.

Annotation:

However, use of a ZIP file as the container for the EPUB hinders linking into, between, or within an EPUB book which is not helped through the specification's lack of detail on linking. Additionally, EPUB lacks within the specification consideration of annotation. This lack of a standardized way to annotate EPUB books leads to ad-hoc solutions resulting in it being difficult or impossible to share and/or transfer annotations therefore limiting the use of EPUB as it cannot provide a level of interactivity comparable to the web.

In contrast to EPUB PDF files can be annotated, highlighted, and notes added by a variety of proprietary software application including Adobe Acrobat, Tracker Software's PDF-XChange Viewer, Aji's iAnnotate, GRAHL Software Design's PDF Annotator, neu.Pen's neu.Annotate PDF, FoxIt's Foxit Reader, and Nitro's Nitro Pro 7. However, each of these applications the software application opens the source PDF document, provides the tools for the user to edit and/or annotate the content and then it is saved directly back into the PDF format.

Accordingly, no common format exists to handle annotations within eBooks. Those made to PDF eBooks are stored internally such that all users with rights to DRM protected eBooks or all users in unprotected eBooks can view the annotations and amend, edit, add to these. At present such annotations have been primarily focused to managing the generation of content by allowing such annotations to represent reviewer contents such that the next released version of the content contains the comments that have been accepted with respect to the reviewer(s).

Digital Rights Management:

The EPUB specification does not require use of Digital Rights Management (DRM) explicitly as this is handled as an additional layer nor does it name any particular DRM system to use, so that publishers can choose a DRM scheme to their liking such as Apple FairPlay™ or Adobe Content Server. However, future versions of EPUB, specifically the Open Container Format (OCF) standard, may specify a format for DRM.

FairPlay™ protects files by encrypting content using an Advanced Encryption Standard (AES) algorithm in combination with a Message-Digest Algorithm, e.g. MD5 hashes. The master key required to decrypt the encrypted content is also stored in encrypted form in the content container file. Each time a new customer uses Apple's software to buy content, a new random user key is generated and used to encrypt the master key wherein the random user key is stored, together with the account information, on Apple's servers, and also sent to the user's version of the software on their computer platform which are then stored in its own encrypted key repository. Using this key repository, the software application is able to retrieve the user key required to decrypt the master key and then, using the master key decrypt the content to render it to the user. Users authorize computers rather than specific content and hence when authorizing a new computer Apple's servers in response to the request transmit all user keys associated with the account information.

Adobe Content Server is DRM software used to add digital rights management to eBooks developed by Adobe Systems. It is designed to "protect" and distribute Adobe eBooks in PDF or EPUB format through Adobe Digital Editions which uses the proprietary Adobe Digital Experience Protection Technology (ADEPT) DRM concept, which is also implemented on some eBook readers such as the Sony Reader. The software locks content to up to six machines and allows the user to view the content on each of them. The underlying concept in ADEPT is similar to that employed in FairPlay™ but using RSA public key cryptography. Accordingly, a per-user RSA key, created from the product of two large prime numbers along with an auxiliary value, is published and used to encrypt a per-book AES key which encrypts the content.

Accordingly, at present eBooks are published and handled with a combination of techniques, for example in DRM and annotations, which exploit techniques developed primarily for other applications. For example, FairPlay™ was originally employed with iTunes™ to protect digital audio content in 2001 and is essentially mirrored in the other dominant DRM solution of Adobe Content Server. EPUB does not support annotations being developed upon Open eBook (formally Open eBook Publication Structure (OEBPS)) which is a legacy eBook format. At the same time techniques for annotating PDFs for eBooks are the same as those established for collaborating and reviewing documents during content generation and release rather than considering post-release annotation by users of protected content. Similarly, licensing is addressed from the viewpoint of releasing a single eBook to a single user in the same manner as previously the user purchased music rather than considering enterprises purchasing multiple copies for use by varying members within their organization.

Accordingly, to date eBook applications have been focused to only one aspect of the multi-faceted world of publishing, namely the replacement of physical books with an electronic book format. Accordingly, it would be beneficial to provide users with an eBook software system that addresses the multiple facets of publishing that have evolved over the past two hundred years of publishing. It would also be beneficial for the eBook software systems and/or software applications to leverage the benefits and potential that the Internet and high-speed communications provide including, but not limited to leveraging social media, supporting crowd sourcing, allowing streaming content, supporting multimedia content within annotations, and supporting hyperlinks within annotations.

It would also be beneficial for such eBook software systems and/or software applications to enable new paradigms that provide consumers, authors, publishers, retailers, and others with new models for releasing digital content from editorial and authorship viewpoints; new models for providing digital rights management; new models for publishers to release revised editions, errata, new additions, etc; new methods of engaging social networks within work and private environments with associated content (annotations) to the original release content; and supporting discussion and information dissemination within a wide variety of environments from education to business to book clubs etc. Within such eBook software systems and/or software applications the inventors consider primary (electronic) content as being content having defined authorship and released with or without digital rights, and secondary (electronic) content as being additional content associated with predefined elements of the primary content generated by one or more users with associated characteristics in terms of releasing the secondary content to one or more other users.

Accordingly the inventors have addressed providing benefits in terms of providing; supporting community interaction with electronic content; licensing electronic content with re-assignable rights and the ability to issue sub-rights; generating and rendering combined content from primary content and one or more secondary content sources with low network overhead; providing the ability to issue partial licenses to users with predetermined validity; and distributing electronic content with fingerprinting allowing unique identification of sources of non-authorised content. Additionally, users address the navigation of eBooks generically rather than the current dominant sectors of works of fiction and historical non-fiction such as biographies. Such works are read sequentially and accordingly easily rendered in a linear fashion to the user. However, a dictionary, a thesaurus, a user manual, a set of legal statutes, a cookery book are accessed in manners that may be described as non-linear or randomly by users such that different renditions of location and movement with the electronic content are required other than a table of contents, page numbers, and an index which mimic their historical paper predecessors or releases.

The inventors have considered it beneficial to provide the release of electronic content in manner wherein primary and secondary electronic content may be subsequently combined from multiple sources to generate a new eBook which may be sold with well documented flow-through licenses and revenue allocation based upon rights embedded to content elements.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations and disadvantages of the prior art with respect to electronic content and more specifically to licensing, annotating, publishing, generating, rendering, and social community engagement of electronic content.

In accordance with an embodiment of the invention there is provided a method comprising:
a server comprising at least a first processor and a first memory hosting and executing a first software application, the memory storing primary content relating to a publication and second content relating to the publication generated by a user;
an electronic device comprising at least a second processor, a second memory, a user interface and a display and hosting and executing a second software application; wherein
the electronic device and server communicate via a communications network to transfer merged, rendered, encrypted and fingerprinted primary and secondary content to the electronic device from the server and new secondary content to the server from the electronic device as generated by the user using the electronic device.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 12 depicts a flowchart according to an embodiment of the invention relating to a SS-SA wherein secondary content generated by a user under a first license may be de-activated and re-activated under a second license in association with the source of primary content to which the secondary content relates;

FIG. 13 depicts a flowchart according to an embodiment of the invention relating to a SS-SA wherein secondary content generated by a user in association with primary content may be associated with different levels of publication by the user;

DETAILED DESCRIPTION

Figure 1:
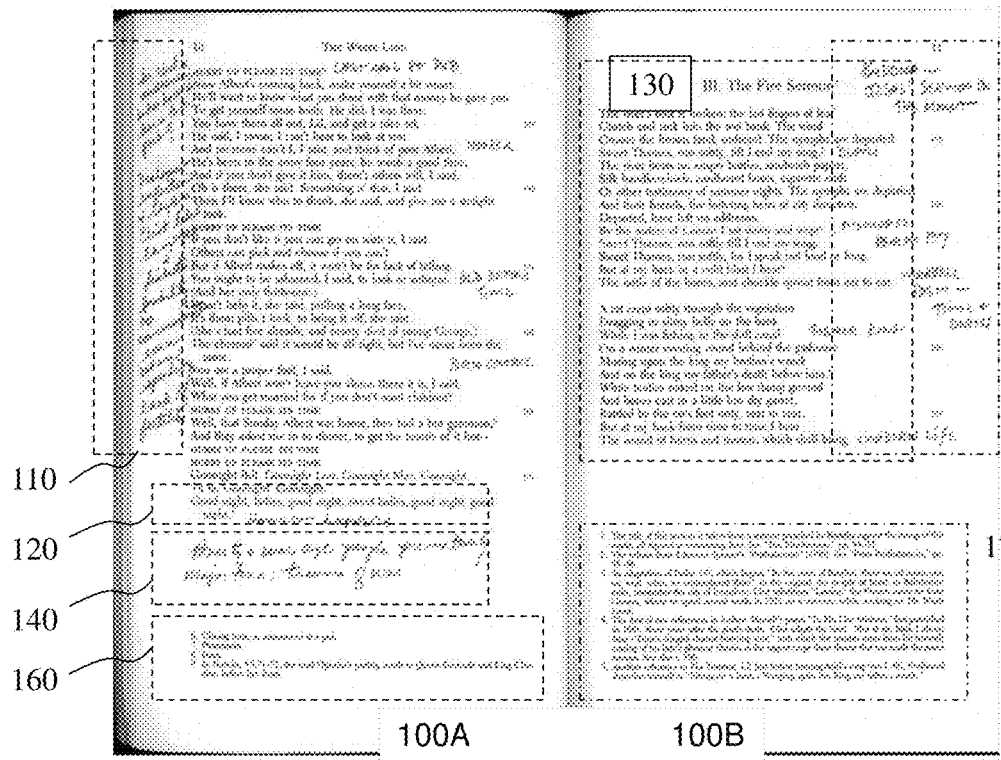
FIG. 1 depicts an example of annotations made by a user of a conventional paper based book according to the prior art.

The present invention is directed to electronic content and more specifically to licensing, annotating, publishing, distributing, updating, searching, generating, rendering, and social community engagement of electronic content.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims. Where embodiments of the invention are described with respect to process flows or flowcharts then these are described with respect to this embodiment. It would be evident that two or more flowcharts may be combined or linked.

A "mobile electronic device" as used herein and throughout this disclosure, refers to a wireless device used for communication that requires a battery or other independent form of energy for power. This includes, but is not limited to, devices such as a cellular telephone, smartphone, personal digital assistant (PDA), portable computer, pager, portable multimedia player, portable gaming console, laptop computer, tablet computer, and an electronic reader. A "fixed electronic device" (FED) as used herein and throughout this disclosure, refers to a wireless device or wired device used for communication that does not require a battery or other independent form of energy for power. This includes, but is not limited to, devices such as Internet enable televisions, gaming systems, desktop computers, kiosks, and Internet enabled communications terminals.

A "network operator" or "network service provider" as used herein may refer to, but is not limited to, a telephone or other company that provides services for mobile phone subscribers including voice, text, and Internet; telephone or other company that provides services for subscribers including but not limited to voice, text, Voice-over-IP, and Internet; a telephone, cable or other company that provides wireless access to local area, metropolitan area, and long-haul networks for data, text, Internet, and other traffic or communication sessions; etc.

A "software system" as used as used herein may refer to, but is not limited to, a server based computer system executing a software application or software suite of applications to provide one or more features relating to the licensing, annotating, publishing, generating, rendering, encrypting, social community engagement, storing, merging, and rendering electronic content and tracking of user and social community activities of electronic content. The software system being accessed through communications from a "software application" or "software applications" and providing data including, but not limited to, electronic content to the software application. A "software application" as used herein may refer to, but is not limited to, an application, combination of applications, or application suite in execution upon a portable electronic device or fixed electronic device to provide one or more features relating to one or more features relating to the licensing, annotating, publishing, generating, rendering, encrypting, social community engagement, storing, merging, and rendering electronic content and tracking of user and social community activities of electronic content.

"Primary content" and "Title" as used herein and throughout this disclosure refers to, but is not limited to, electronic content generated by an author and/or published by a publisher with or without content digital rights which is made available through a software system to a user via a software application with a procurement process that may or may not require a financial transaction between the user and a provider of the primary content. The provider may be the author, publisher, an operator of the software system, or a third party engaged by one or more of the preceding. The primary content may include one or more of text, characters, audiovisual content and multimedia content relating to an author or authors relating to a subject or subjects. Examples of primary content may include eBooks and other electronic documents including, but not limited to, novels, manuals, user guides, reference materials, reviews, specialist subject materials, journals, newspapers, music, movies, cartoons, videos, television programming, brochures, and software.

"Secondary content" as used herein and through this disclosure refers to, but is not limited to, electronic content generated by a user with or without digital rights which is made available through a software system to a user via a software application with or without user digital rights associated with said secondary content. Said user digital rights relating to the predetermined portion of a community of users of the software system/software application that may view the secondary content generated by the user. The secondary content may include, but is not limited to, one or more of text, characters, audiovisual content and multimedia content.

A "publisher" as used herein and through this disclosure refers to, but is not limited to, an enterprise or organization engaged in publishing through performing one or more stages of the development, acquisition, copyediting, graphic design, production, release, and marketing and distribution of electronic content, referred to in this specification as primary content. Typically, publishers acquire content from authors, but authors may be their own publishers, meaning, originators and developers of electronic content can also deliver the electronic content for the same. An "author" as used herein and through this disclosure refers to, but is not limited to, an individual or group of individuals who originate or give existence to anything that may be considered electronic content and their authorship determines responsibility for what is created. More traditionally an author is the originator of any written work which may be represented electronically as electronic content. However, an author may originate through one or more of text, characters, audiovisual content and multimedia content.

A "user" as used herein and through this disclosure refers to, but is not limited to, a person or device that utilizes the software system and/or software application (SS-SA) and as used herein may refer to a person, group, or organization that has registered with the SS-SA to acquire primary content and generates secondary content in association with the primary content. A "curator" or "librarian" as used herein and through this disclosure refers to, but is not limited to, a person or group of individuals having rights to manage one or more aspects of the license(s) of primary content and their associated sub-licenses as well as one or more aspects of the associations of users to groups and the according distribution of the secondary content from these users.

Referring to FIG. 1 there is depicted an image of an example of annotations made by a user of a conventional paper based book 100 according to the prior art. As depicted the book 100 is open and has left page 100A and right page 100B comprising pages 10 and 11 of a book of poetry. Left page 100A comprises "The Waste Land" wherein the last two lines are indicated by first box 120 and right page 100B comprises "III. The Fire Sermon" wherein the whole poem is indicated with second box 130. Down the left hand side of first page 100A are first annotations 110 written by hand by a reader of the poem "The Waste Land" and beneath are second annotations 140. Other annotations are indicated on right page 100C by handwritten notes 150. At the bottom of each of left and right pages 100A and 100B respectively are first and second footnote lists 160 and 170 respectively that contain translations, modern equivalents, citations, and references to aid the reader in understanding the poem.

This conventional structure of pages with margins (not identified but forming the defined white space around the border of the page), footnotes, and page numbers has been maintained within the PDF structure which represents one of the two dominant formats of electronic publishing for written content. As such content generated today within a desktop publishing application and converted to PDF format is paginated according to the settings of the application by default or as set by the user when generating the PDF. Accordingly, when displayed upon different devices with different screen dimensions the page will be dimensioned to fit unless the user zooms. For many portable electronic devices the required magnification is such that the user must scroll left-right and up-down to read the entire content of one page before moving to the next page. This pre-paginated fixed dimension structure of PDFs is not reflected in EPUB structured content which is rendered with a predetermined character format such that the amount of content displayed in each electronic device varies with screen dimension and user adjustment in the character font size.

Figure 2:
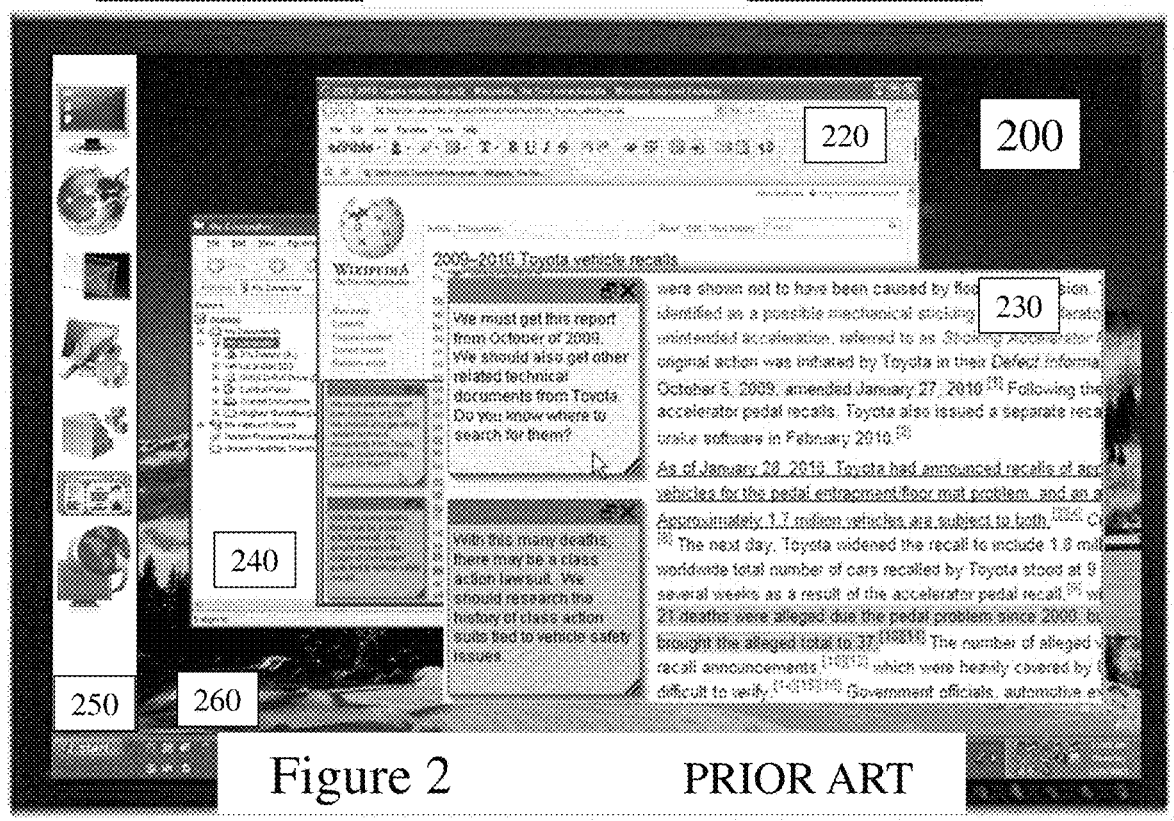
FIG. 2 depicts an exemplary screenshot of a prior art software application "Scrible" for annotating electronic content.
Figure 3:
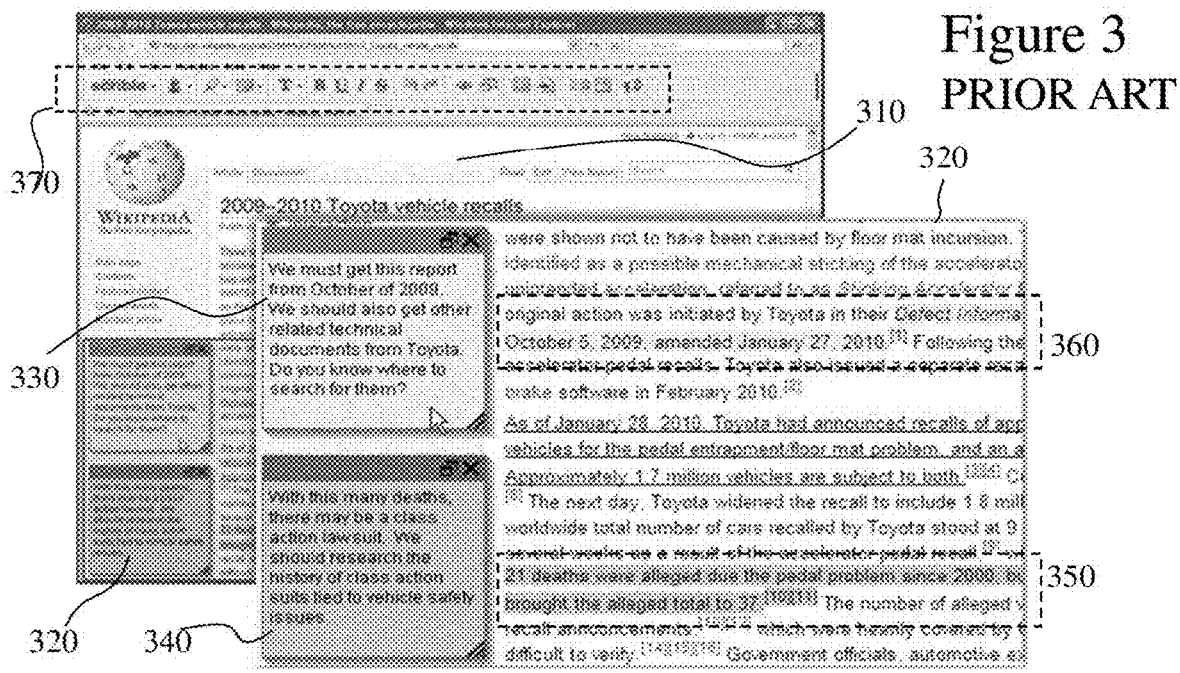
FIG. 3 depicts details of the prior art software application "Scrible" depicted in FIG. 2.

Now referring to FIG. 2 there is depicted an exemplary screenshot 200 of a prior art software application "Scrible" for annotating electronic content within a web page. As depicted a screen displays a background 260 and application toolbar 250 together with "Explorer" window 240 and webpage 220 which depicts part of a Wikipedia™ article relating to "2009-2010 Toyota vehicle recalls" which has been annotated as evident from annotation window 230. Webpage 220 and annotation window 230 are depicted in expanded form in FIG. 3 with first and second webpages 310 and 320 respectively. Within first webpage 310 is shown "Scrible" toolbar 370 which has been accessed by the user and provides the user with a variety of tools for annotating. Second webpage 320 shows first and second annotations 330 and 340 respectively together with first and second highlighted text sections 360 and 350 which were highlighted by the user prior to associating first and second annotations 330 and 340 respectively to them.

Figure 4:
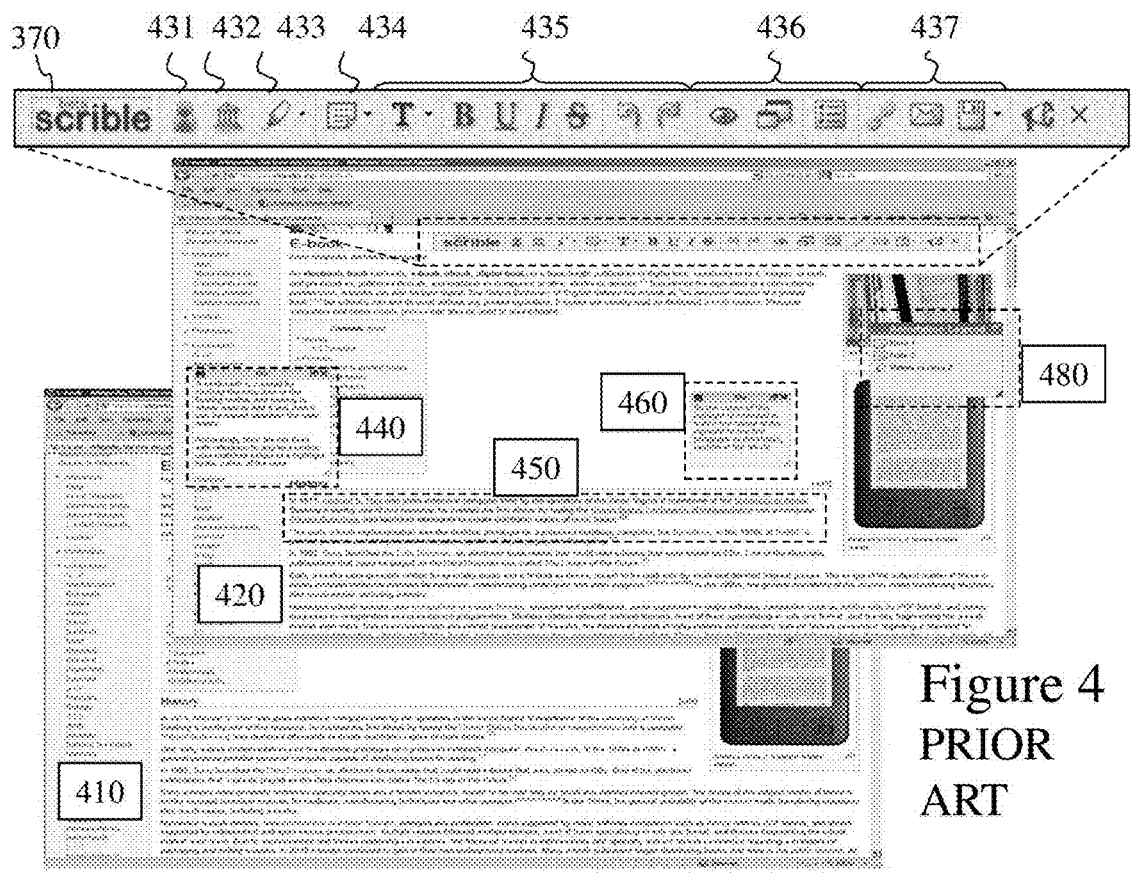
FIG. 4 depicts an exemplary use of the prior art software application "Scrible"

The "Scrible" toolbar 370 is depicted again in FIG. 4 wherein features within the "Scrible" toolbar 370 are indicated including "Sign-In" 431, "Library" 432, "Highlight" 433, "Add Note" 434, "Text Format" buttons 435, "Display-Hide Annotations-Notes" buttons 436, and "Link-Mail-Save" buttons 437. These elements in the "Scrible" toolbar 370 allow a user to annotate a webpage such as shown in first image 410 which when annotated appears as shown in second image 420. Accordingly, within second image 420 there are shown "Scrible" toolbar 370 bookmark 440 together with annotation 460 and associated highlighted text 450. Also shown is annotations legend 480 which allows a user to keep track of the notes and associated highlights. Accordingly, a user may through "Scrible" toolbar 370 add annotation to a webpage and then use "Link-Mail-Save" buttons 437 which allow the user to create a link to the annotated web page to provide to other users, email the annotated page to another known user, and save the annotated web page to a "Scrible" account associated with the user. Accordingly, a user must know another user in order to provide a link from their annotated web page or to email the annotated web page to them.

Figure 5:
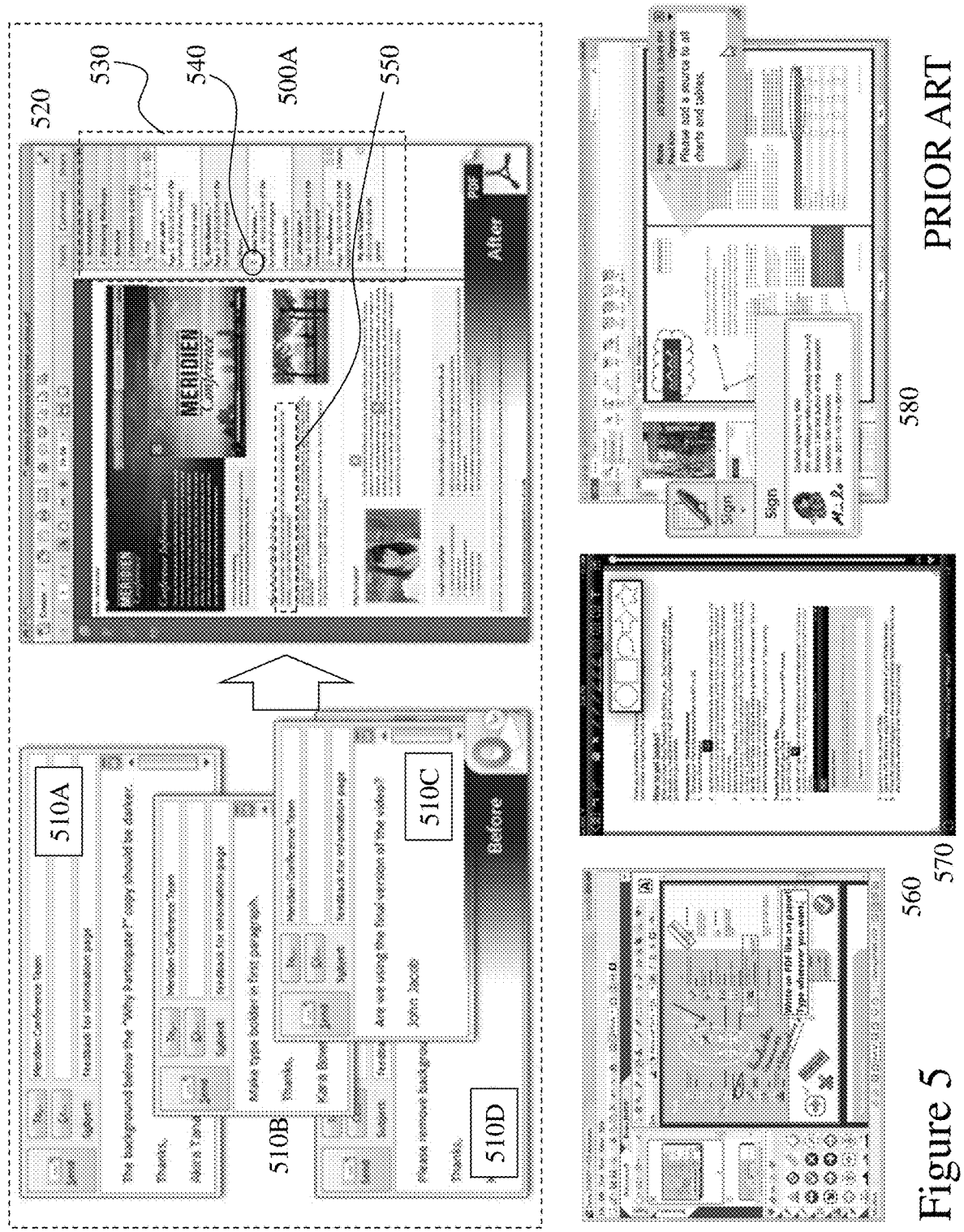
FIG. 5 depicts examples of other prior art software applications for annotating web based and PDF based electronic content.

Referring to FIG. 5 there are depicted examples of other prior art software applications for annotating web based and PDF based electronic content. These include Adobe Acrobat 500A which allows comments from first to fourth users 510A through 510D to be distributed to a user group for incorporation into the next revision of the PDF document during editing process 520. Such distributed release of an initial version of a document with comments returned by email exists with other applications, e.g. Microsoft Word, but within Adobe Acrobat this is extended wherein when the author opens the document to edit it in editing process 520 the user sees the emails directly within sidebar window 530. Further, where a reviewer has highlighted content 550 this is reflected in indicators 540 within the sidebar window 530. Also depicted in FIG. 5 are images from Grahl's "PDF Annotator" 560, neu.Pen's "neu.Annotate PDF" 570, and Nitro's "PDF 7" 580 which represent three of the multiple annotating applications developed for annotating PDF content. These other applications provide text based annotations, either typed or handwritten, and exploit colour for associating annotations to elements of the PDF.

Figure 6:
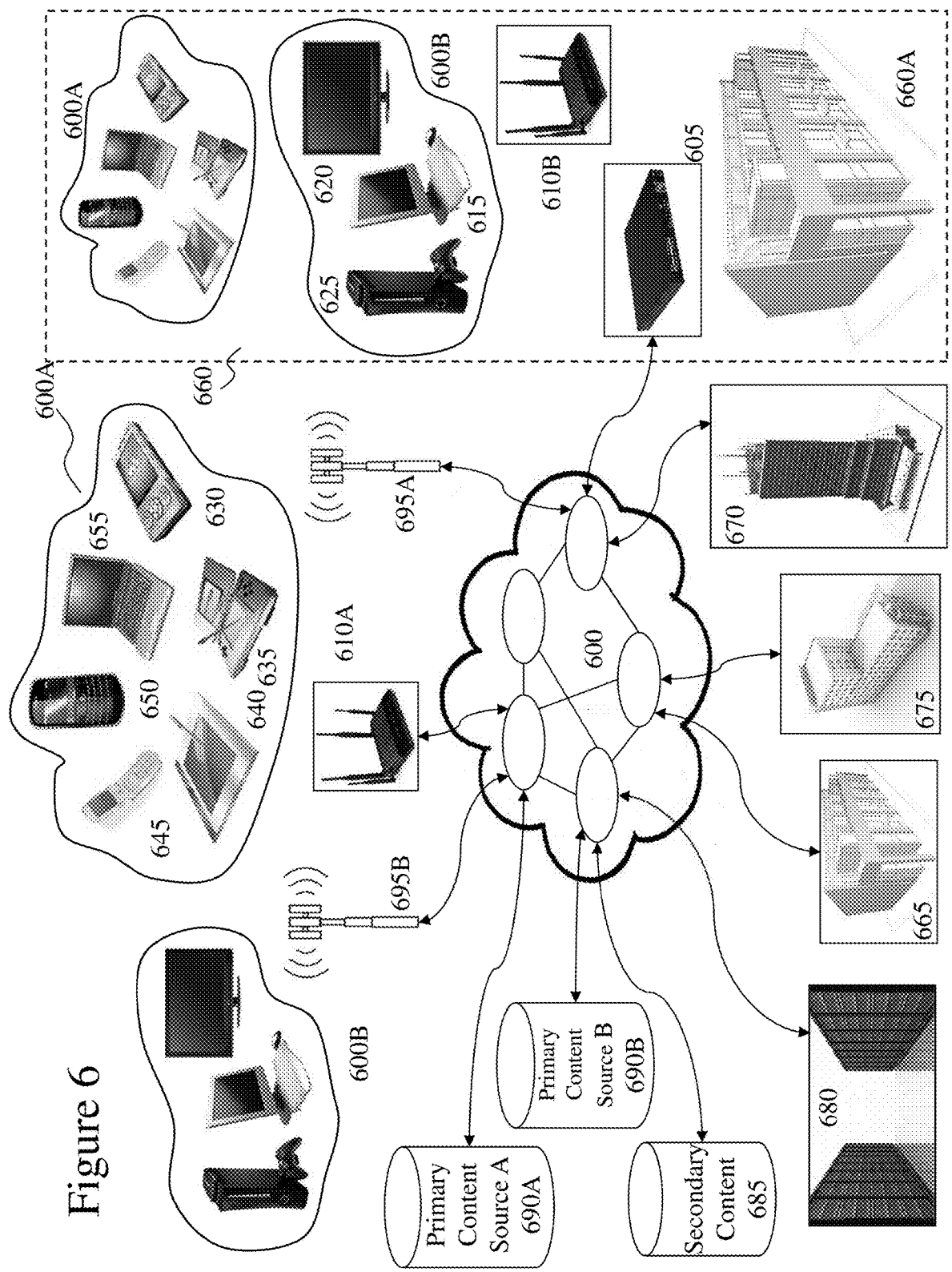
FIG. 6 depicts a network supporting communications and interactions between devices connected to the network and a software system according to an embodiment of the invention.

Now referring to FIG. 6 there is depicted a network supporting communications and interactions between devices connected to the network and a software system according to an embodiment of the invention. As shown first and second user groups 600A and 600B respectively interface to a telecommunications network 600. Within the representative telecommunication architecture a remote central exchange 680 communicates with the remainder of a telecommunication service provider's network via the network 600. The central exchange 680 is connected via the network 600 to local, regional, and international exchanges (not shown for clarity) and therein through network 600 to first and second wireless access points (AP) 695A and 695B respectively which provide Wi-Fi cells for first and second user groups 600A and 600B respectively. Also connected to the network 600 are first and second Wi-Fi nodes 610A and 610B, the latter of which being coupled to network 600 via router 605. Second Wi-Fi node 610B is associated with first building 660A and having within this environment 660 first and second user groups 600A and 600B which are connected to the network 600 via wireless interfaces such as second Wi-Fi node 610B via router 605. Second user group 600B may also be connected via wired interfaces which may or may not be routed through a router such as router 605.

Within the cell associated with first AP 695A the first group of users 600A may employ a variety of portable electronic devices including for example, laptop computer 655, portable gaming console 635, tablet computer 640, smartphone 650, cellular telephone 645 as well as portable multimedia player 630. Within the cell associated with second AP 695B are the second group of users 600B which may employ a variety of fixed electronic devices including for example gaming console 625, personal computer 615 and wireless/Internet enabled television 620 as well as cable modem 605.

Also connected to the network 600 is cell tower 690 that provides, for example, cellular telephony services as well as evolved services with enhanced data transport support. Cell tower 690 proves coverage in the exemplary embodiment to first and second user groups 600A and 600B. Alternatively the first and second user groups 600A and 600B may be geographically disparate and access the network 600 through multiple cell towers, not shown for clarity, distributed geographically by the network operator or operators. Accordingly, the first and second user groups 600A and 600B may according to their particular communications interfaces communicate to the network 600 through one or more wireless communications standards. It would be evident to one skilled in the art that many portable and fixed electronic devices may support multiple wireless protocols simultaneously, such that for example a user may employ GSM services such as telephony and SMS and Wi-Fi/WiMAX data transmission, VOIP and Internet access.

Also connected to the network 600 are first to third enterprises 665 through 675 which may for example represent locations for authors, publishers, software system/software application providers, and users which may exploit combinations of wired and wireless networks. First and second primary content sources 690A and 690B together with secondary content source 685 are also connected to network 600 which respectively house primary content generated by authors and/or publishers and secondary content generated by users respectively. Additionally first and second primary content sources 690A and 690B together with secondary content source 685, and others not shown for clarity, may host according to embodiments of the inventions multiple services associated with a provider of the SS-SA associated with the electronic content distribution including, but not limited to, dictionaries, speech recognition software, product databases, inventory management databases, retail pricing databases, license databases, customer databases, and software applications for download to fixed and portable electronic devices. First and second primary content sources 690A and 690B together with secondary content source 685 may also host for example other Internet services such as a search engine, financial services, third party applications and other Internet based services.

Figure 7:
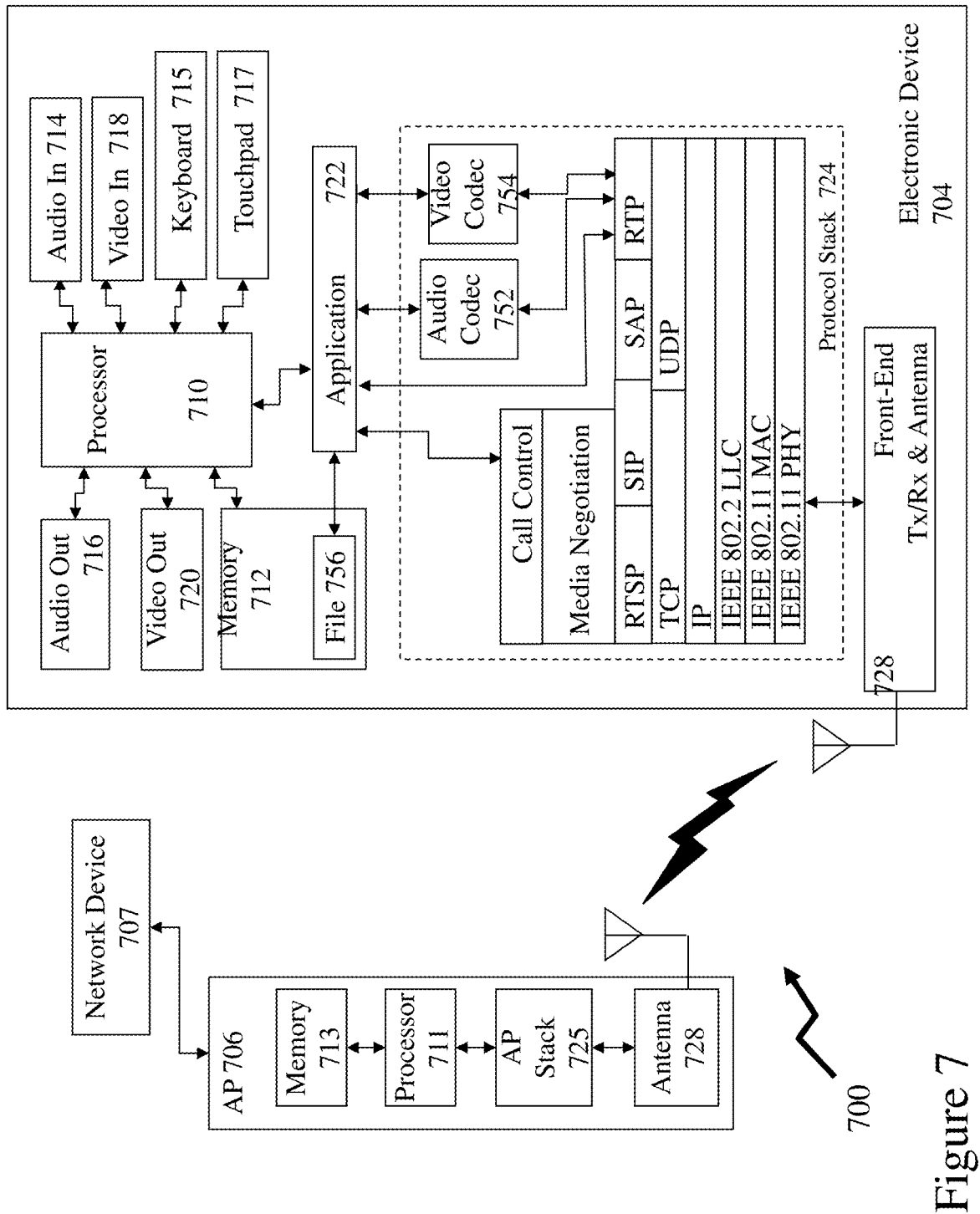
FIG. 7 depicts an electronic device supporting communications and interactions to the network depicted in FIG. 6.

Referring to FIG. 7 there is depicted an electronic device 704, supporting communications and interactions according to embodiments of the invention. Electronic device 704 may for example be a portable electronic device or a fixed electronic device and may include additional elements above and beyond those described and depicted. Also depicted within the electronic device 704 is the protocol architecture as part of a simplified functional diagram of a system 700 that includes an electronic device 704, such as a smartphone 655, an access point (AP) 706, such as first Wi-Fi AP 610, and one or more network devices 707, such as communication servers, streaming media servers, and routers for example such as first and second servers 175 and 185 respectively. Network devices 707 may be coupled to AP 706 via any combination of networks, wired, wireless and/or optical communication links such as discussed above in respect of FIG. 1. The electronic device 704 includes one or more processors 710 and a memory 712 coupled to processor(s) 710. AP 706 also includes one or more processors 711 and a memory 713 coupled to processor(s) 711.

Electronic device 704 may include an audio input 714, for example a microphone, and an audio output 716, for example, a speaker, coupled to any of processors 710. Electronic device 704 may include a video input 718, for example, a video camera, and a video output 720, for example an LCD display, coupled to any of processors 710. Electronic device 704 also includes a keyboard 715 and touchpad 717 which allow the user to enter content or select functions within one of more applications 722 that are typically stored in memory 712 and are executable by any combination of processors 710. Electronic device 704 includes a protocol stack 724 and AP 706 includes a communication stack 725. Within system 700 protocol stack 724 is shown as IEEE 802.11 protocol stack but alternatively may exploit other protocol stacks such as an Internet Engineering Task Force (IETF) multimedia protocol stack for example. Likewise, AP stack 725 exploits a protocol stack but is not expanded for clarity. Elements of protocol stack 724 and AP stack 725 may be implemented in any combination of software, firmware and/or hardware. Protocol stack 724 includes an IEEE 802.11-compatible PHY module coupled to one or more Front-End Tx/Rx & Antenna 728 as well as IEEE 802.11-compatible MAC and LLC modules together with a network layer IP, transport layer User Datagram Protocol (UDP) module and transport layer Transmission Control Protocol (TCP) modules.

Protocol stack 724 also includes session layer Real Time Transport Protocol (RTP), Session Announcement Protocol (SAP), Session Initiation Protocol (SIP), and Real Time Streaming Protocol (RTSP) modules. Also shown are presentation layer media negotiation and call control modules together with one or more audio and video codecs 752 and 754 respectively. Applications 722 may be able to create maintain and/or terminate communication sessions with any of devices 707 by way of AP 706.

It would be apparent to one skilled in the art that elements of the electronic device 704 may also be implemented within the AP 706 including but not limited to one or more elements of the protocol stack 724.

Figure 8:
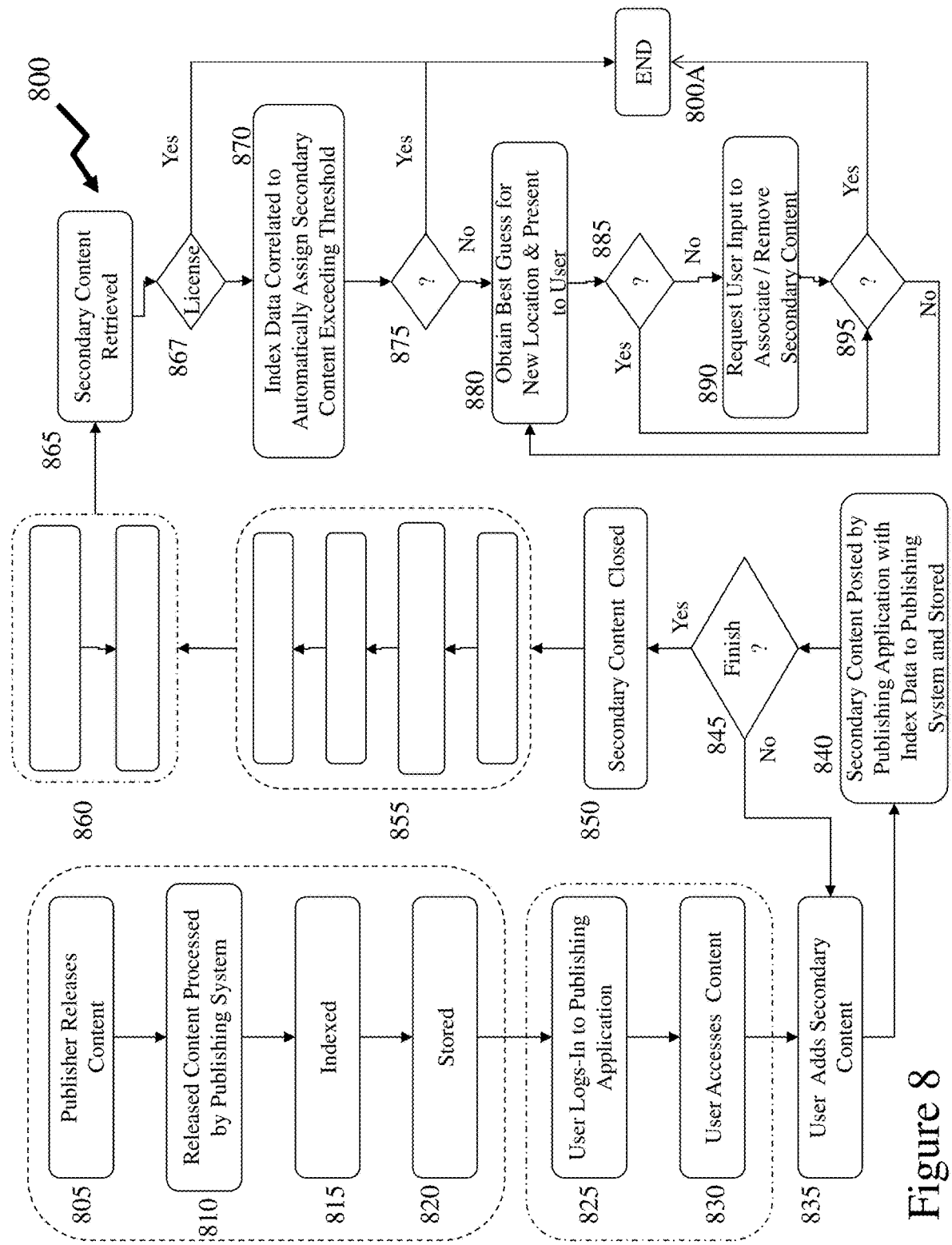
FIG. 8 depicts a flowchart according to an embodiment of the invention relating to a SS-SA electronic content comprising publishing primary content and associating user generated secondary content to the primary content.

Now referring to FIG. 8 there is depicted a flowchart 800 according to an embodiment of the invention relating to a SS-SA for electronic content comprising publishing primary content and associating user generated secondary content to the primary content. In step 805 a publisher releases content to a software system according to an embodiment of the application. Publisher released content may be formatted according to an electronic publishing standard including, but not limited to, EPUB and PDF, or according to the standards of a desktop content processing and/or publishing system including, but not limited to, Microsoft Word, Corel WordPerfect, Microsoft Publisher, Adobe PageMaker, and Apple Pages. Next in step 810 the received publisher content is processed to provide the published content in a format compatible with the software system/software application which may include, but not limited to, removing pagination and converting format to generate the primary content. At this point the title of the primary content, publisher information, retail sales price, licensing conditions etc are generated and posted to a database upon a retail server forming part of the software system wherein users may browse and identify primary content to access.

Subsequently in step 815 the released content is indexed by the software system wherein the index is then stored in association with the primary content in step 820. In step 825 a user logs-in to a software application that accesses the software system allowing the user to search and identify primary content of interest. Accordingly, in step 830 the user accesses the primary content and utilises it wherein at some point they subsequently decide in step 835 to annotate the primary content. In step 840 the secondary content is posted by the software application to the software system wherein it is indexed and added to the secondary content stored in relation to the title and the user, or a file pointer stored to where the secondary content is stored in relation to the title and the user. As will be evident in relation to secondary content in other embodiments of the invention pointers to stored content have benefit in allowing pointers to be added to multiple users or published openly.

Next in step 840 the process checks to see if the user has finished their current session with the primary content wherein if not the process loops back to step 835, otherwise it proceeds to step 850 and the secondary content closed along with the primary content. Subsequently, the publisher issues a new release of the primary content, for example the next year's edition or a revised edition, in step 855 which repeats the sequence discussed above in respect of steps 805 through 820 in publishing, processing, indexing, and storing the new primary content. Accordingly, the next time the user logs-in in step 860, which repeats steps 825 and 830 discussed above, the process now retrieves the previously stored secondary content associated with the user in step 865. The SS-SA being aware of the up-issued primary content checks in step 867 whether the user has a license to the up-issued primary content. If not, the process moves to step 800A and terminates, otherwise it proceeds to step 870 wherein the software system automatically correlates the secondary content of the user with its associated index data against the new index data of the newly released primary content and automatically associates the secondary content to the new primary content where the correlation exceeds a predetermined threshold. Next in step 875 the process determines whether all secondary content has been re-associated to the new primary content and if so proceeds to step 800A and ends, otherwise the process proceeds to step 880 wherein the system software obtains best "guesses" for locations of the secondary content. These are presented to the user allowing them to confirm the locations in step 885 wherein the process moves forward to step 895 or proceeds to step to 890 wherein user input to determine the new association or removal of secondary content is established after which the process moves to step 895. In step 895 the process determines whether all secondary content has been re-associated in which case it proceeds to step 800A otherwise it loops back to step 880.

Optionally the information generated in step 810 including, but not limited to, primary content title, publisher, retail sales price, and licensing terms and conditions may be posted from the database to another system, such as for example the Publishers server systems or third party retailer server systems, e.g. Amazon™. The servers, remote servers and associated systems can therefore provide discreetly or in combination the sales vehicle (eStore) for the primary content so that the primary content may be purchased from one or more of the software system, the Publishers systems, and third party systems which may be within an entirely other system such as the Publishers server collection. These remote servers can therefore handle the purchase transaction (sale) based on the licensing conditions and then communicate to the software system through asynchronization server via web based services to create and execute the licensing steps. These web based services may additionally require a password/key unique to the publisher or third party retailer which may be generated and used according to one or more of the well known key/password techniques in the prior art.

It would be evident that rather than requiring users to log-in through the software application to initially identify primary content that an initial search may be performed by the user through an Internet browser wherein upon the user first selecting an item of primary content to access the user when entering personal credentials, financial credentials etc to establish their user account downloads the software application to their electronic device. Subsequently upon logging into their user account from another electronic device that does not have the software application installed this will be downloaded as part of the process. It would be evident to one skilled in the art that the software application may be a light application requiring low memory requirements on the electronic device in order to support use upon a wide range of electronic devices and facilitate rapid transfer in conditions of low connectivity. In other instances, a standard application may be downloaded and installed by the user to their electronic device or electronic devices. Optionally such installations may be performed by the information technology department of an enterprise wherein use of the software application will be relatively widespread or in other instances it may be pre-installed upon a range of electronic devices.

It would also be evident to one skilled in the art that the automated re-association of secondary content to updated primary content allows the software system to maintain the preceding work of the user(s) thereby enhancing the benefit to the user. It allows the publisher to consider a different publishing model for updates, errata etc as rather than an annual release or new edition to minimize lost entries from the user. Accordingly, a publisher may release the primary content whenever they wish, such as chapter by chapter for example as revised and available. In fact, multiple small releases rather than a single large release could provide improved efficiency in handling associated secondary content. Additionally, the continuous release of content from a publisher in respect of a title should negatively impact piracy as the title rapidly and frequently obsoletes. It would be evident that where multiple releases have occurred that the SS-SA may provide the reverse of this process allowing the user to "unwind" or "go back in time" with respect to a particular release and/or date in time to establish the primary and secondary content at that point. This being particularly appropriate in fields such as law where, in many instances, the applicable statute is defined as that at a particular time.

Figure 9:
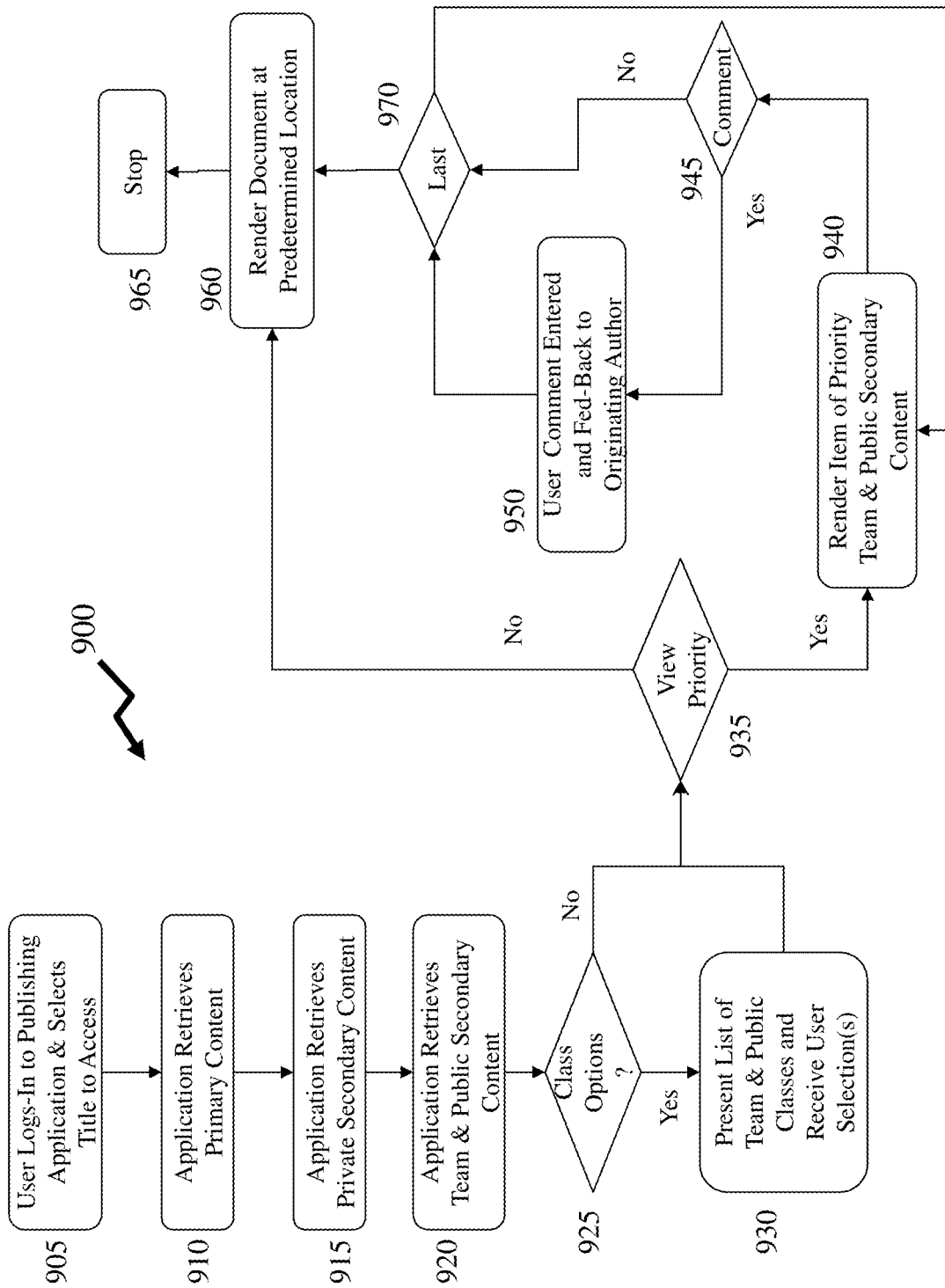
FIG. 9 depicts a flowchart according to an embodiment of the invention relating to a SS-SA rendering published primary content and filtered secondary content to a user.

Referring to FIG. 9 there is depicted a flowchart 900 according to an embodiment of the invention relating to a SS-SA rendering published primary content and filtered secondary content to a user. Accordingly, the process begins at step 905 wherein a user logs-in to the software application and/or software system and selects the primary content that they wish to access which is then retrieved in step 910 according to the title and/or user settings. In step 915 the SS-SA retrieves the private secondary content of the user associated with the primary content before proceeding to step 920 to retrieve public and team secondary content, which will be discussed further in respect of FIG. 13 below where secondary content may be considered as being within multiple classes such as private, team, project, enterprise, and public for example or alternatively being published with different rights requirements of the user to access.

In step 925 the software application and/or software system prompts the user where the retrieved secondary content has multiple classes as to whether they wish to refine the secondary content which will be rendered with the primary content. If not, the process moves to step 935 wherein the process determines whether there is priority content that has not been previously viewed by the user and prompts the user as to whether they wish to view this priority content or not. If the user elects to apply a filter on the secondary content then the process moves to step 930 wherein the software application and/or software system presents the user with a list of classes relating to the secondary content and receives their selection before proceeding to step 935.

In step 935 the user determines whether to view this priority content or not, where if not the process proceeds to step 960 and the primary and secondary content are merged and rendered to the user. If the user determines to view priority secondary content then the process moves to step 940 wherein an item of primary content and its associated priority secondary content are merged and rendered to the user and the process moves to step 945. At this point the user may comment on the priority annotation or not, if not the process proceeds to step 970 to determine whether additional items of priority secondary content remain to be presented to the user. If the user determines to add a comment then the process moves to step 950 wherein the user adds any comments that they wish to make which are then processed by the SS-SA such that they are fed back to the author and added as secondary content extension to the priority secondary content wherein the process moves to step 970.

If remaining priority secondary content remains the process returns to step 940 otherwise it proceeds to step 960 wherein the primary and secondary content are merged and rendered to the user and the process stops. It would be evident to one skilled in the art that user actions in respect of the secondary content may be logged as part of the monitoring activities of the SS-SA. Accordingly, where the user elects not to view priority secondary content that this decision is stored as are any activities with respect to secondary content. It would be evident to one skilled in the art that at process step 960 where the primary and secondary content are merged, rendered and presented to the user that this may be performed in accordance with settings of the SS-SA which are either the default settings of the system, those of the publisher in relation to the primary content, or those established by the user. For example, retrieving "War and Peace" may result in the content being retrieved and rendered to place the user as the location they previously stopped at whereas accessing "Consolidated Intellectual Property Statutes and Regulations with Related Materials 2012" may place the user at the table of contents.

Optionally, the user may be presented with information relating to priority annotations upon entering the software system and/or software application rather than specifically accessing the primary content to which they relate. Accordingly, the user may be presented with those titles to which they have licenses that have new priority annotations together with information such as quantity it etc. A user may then access the secondary content relating to one or more primary content sources in isolation of retrieving each primary content source as well as performing other functions such as flagging all priority annotations as read etc. It would also be evident that some priority annotations may be established as very high priority, for example, such that the user cannot flag these as read or otherwise without actually opening them. The ability to create such very high priority annotations may be restricted to specific users and/or curator.

Figures 10, 11:
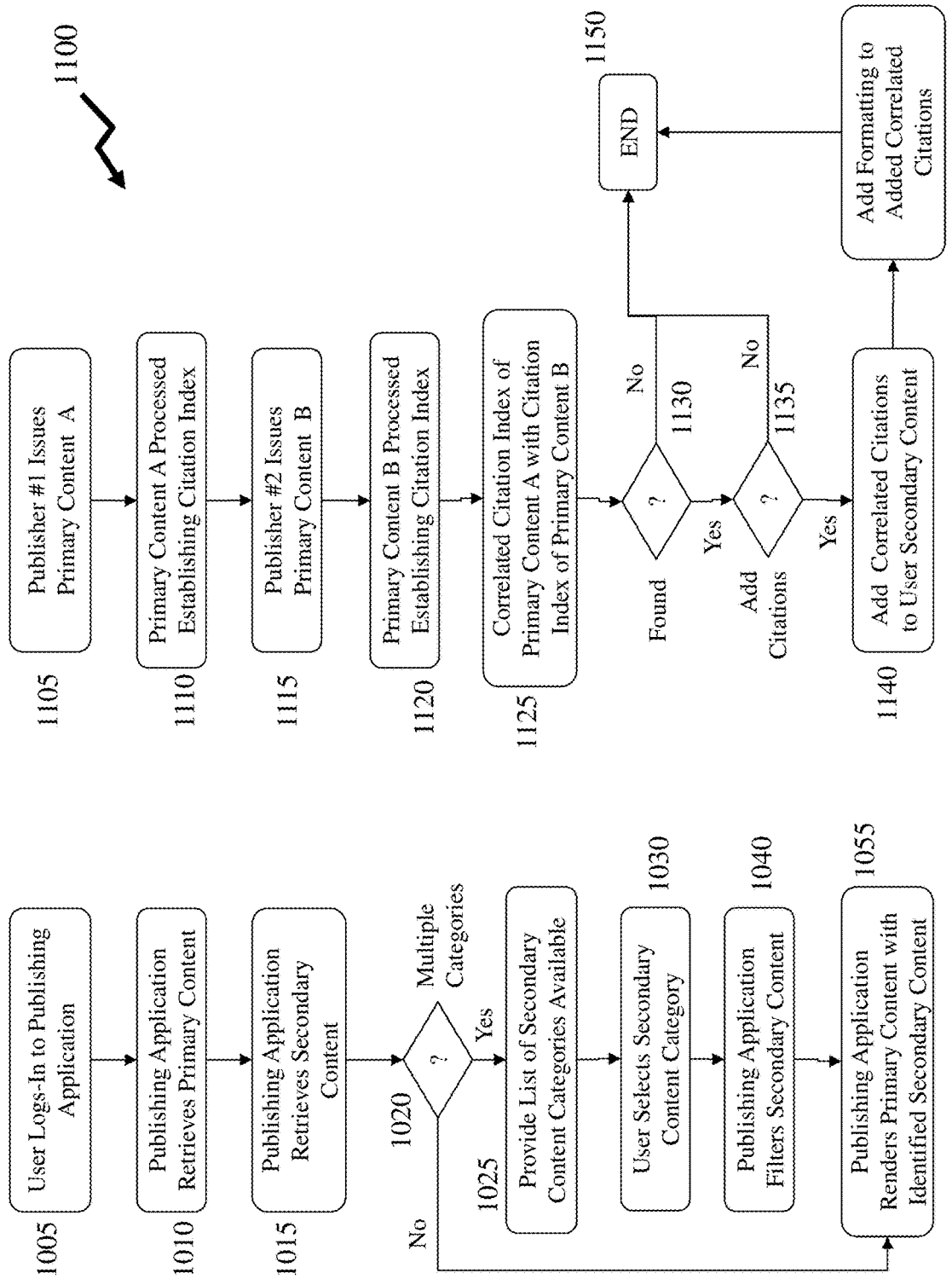
FIG. 10 depicts a flowchart according to an embodiment of the invention relating to a SS-SA wherein a user selects secondary content filtering to be applied in association with primary content for rendering to the user.
FIG. 11 depicts a flowchart according to an embodiment of the invention relating to a SS-SA wherein a second source of primary content provides update citations to secondary content of a user associated with a first source of primary content.

Now referring to FIG. 10 there is depicted a flowchart 1000 according to an embodiment of the invention relating to a software system and/or software application wherein a user selects secondary content filtering to be applied in association with primary content for rendering to the user. In step 1005 a user logs-in to the software application and/or software system and selects the primary content that they wish to access which is then retrieved in step 1010 according to the title and/or user settings. In step 1015 the SS-SA retrieves the secondary content of the user associated with the primary content before proceeding to step 1020. In step 1020 the software application and/or software system determines whether there are multiple categories of secondary content relating to the primary content, if not the process proceeds to step 1055 wherein the primary and secondary content are rendered with the secondary content to the user.

If there are multiple categories of secondary content then the process proceeds from step 1020 to step 1025 wherein the list of these is presented to the user. These multiple classes may include for example:

Private—the secondary content is reserved solely for the user creating it;

Team—the secondary content is associated with a group of users defined by a user and/or "curator" wherein the secondary content of a user within this group of users relating to a primary content is visible to the others within the group, for example such a group may be all "real estate lawyers" within a law firm or all current Bachelor of Arts students at University of California in Los Angeles studying philosophy;

Project—similar to a team but wherein the group of users may be subject to more dynamic association/disassociation as it relates to a specific activity within an enterprise and may be associated with a wider range of titles than a team;

Enterprise—the secondary content may be accessed by any members of an enterprise granted a license to the title to which the secondary content pertains; and Public—the secondary content is accessible to any user having rights to the primary content.

Such team, project, and enterprise classes may be established and managed by a curator within the software system and then licensed titles assigned to the team, project, enterprise rather than requiring these be established for each title. Optionally, it may be considered that users are granted multiple access rights to secondary content. It would also be evident that the user may be presented with one or more additional filter options within the SS-SA including, but not limited to, specific users, specific time ranges, specific keywords, and annotation type. For example, a user may wish to search within a user manual for a 2011 Toyota Corolla for secondary content in video format relating to spark plug or another user may wish to search for audio annotations relating to John Lennon in an anthology of "The Beatles." Optionally, secondary content presented to a user may be converted according to preferences of the user such that for example in the instance of a user with sight impediment all text based content is processed via a speech convertor and secondary content availability in relation to an item of content denoted by a tone or a plurality of tones. Alternatively, where content in the team, project, enterprise, and public classes may originate from multiple geographic locations a user may elect to have the secondary content to be automatically translated to either a preferred language of the user or the language of the primary content that they are accessing for example.

Referring to FIG. 11 there is depicted a flowchart 1100 according to an embodiment of the invention relating to a SS-SA wherein a second source of primary content provides update citations to secondary content of a user associated with a first source of primary content. At step 1105 a first publisher issues a first item of primary content, primary content A, which is then processed by the SS-SA in step 1110 to generate a citation index in dependence upon the structure of the primary content A and predetermined keyword(s) and/or alphanumeric content(s). For example, if the primary content A was the Canadian Patent Act then the citation index may be generated based upon the numeric structure of the Patent Act which is of format XX.Y(Z)(A) wherein XX, Y and Z are positive integers and A is a character starting at A. Accordingly sections may be for example 28.1, 1, 2, 3, . . . , 28.2(1), 28.2(1)(a), 28.2(1)(b), 28.2(1)(c), 28.2(1)(d) etc and terminated at predetermined depth in the structure such that for example 28.2(1)(d)(i)(A) is not processed but 28.2(1)(d) is.

Next in step 1115 a second publisher issues a second item of primary content, primary content B, being for example the "Canadian Patent Reporter" which is issued weekly, and is processed in step 1120 to generate a further citation index in dependence upon the structure of the primary content B and predetermined keyword(s) and/or alphanumeric content(s). Next in step 1125 the process proceeds to correlate the citation index of the first primary content A with that of the second primary content B wherein the process proceeds to step 1130 and determines whether any matches have been found. If no matches are found the process proceeds to step 1150 and ends, otherwise it proceeds to step 1130 wherein a decision is made in step 1135 whether to add the citations from the second primary content B to the secondary content of the user relating to the first primary content A. If not, the process proceeds to step 1150 and ends, otherwise it proceeds to step 1140 wherein the correlated citations from the second primary content B is added to the secondary content of the user so that the citations are visible to the user when accessing those sections of the primary content A. In step 1145 formatting is added to the citations added to the secondary content so that these are distinguishable to the user and the proceeds then moves to step 1150 and ends.

Optionally the correlation could also take place with an external collection of information, either within the secondary content itself or via features that are part of an applet added to the software application. For example, the SS-SA may store user account information for a Publisher may then code links within the Title (primary content) that generate auxiliary viewpane(s) on the user's electronic device that link to the Publishers web server, or another web service identified in the code link. The software applet could then pass along the necessary login information and the desired information would be returned by the Publisher, or other, server and displayed within the auxiliary viewpane(s) (e.g. browser window(s)). For example, a coded link within the document may relate to another Title published by the Publisher, a commentary, or an update for example.

Alternatively, users creating secondary content who have the software applet installed may also be able to create these types of coded links within their secondary annotations. These coded links would then be active to others users with the applet installed and would proceed (be resolved) in a manner similar to that described above. In the instance that a user did not have the applet installed, they would be directed to a download/marketing page where they could register for the service and acquire the applet. It would also be evident that such coded links could provide users with the ability to add links to their secondary content which refer to other locations which may be within the same Title or within another Title or Titles. Following such a coded link would either open the Title(s) or would present the user with default information regarding that Title(s) that would allow them to acquire the Title(s), for example through a link in an auxiliary viewpane to a marketing page.

As discussed supra in respect of FIG. 9 these correlated citations that are added may further be marked as priority such that the next time the user accesses the primary content these are presented to them for review. It would be evident that the predetermined keyword(s) and/or alphanumeric content(s) may be determined by the user. For example, the user may determine them directly from terms specified by the user in isolation of other prompting, by the user from terms presented to the user based upon the processing of the primary content A, by the user from terms presented to the user from the generation of one or more indices relating to the primary content A or secondary content associated with the primary content A, or by the user from terms presented to the user based upon those selected by the published of the primary content A. It would be further evident that the predetermined keyword(s) and/or alphanumeric content(s) may be determined by a coordinator of a team, project, and/or enterprise which may include the curator. It would also be evident that such features may be a value added feature of the SS-SA which may require an additional subscription fee. Optionally, the second primary content B may in fact be secondary content generated by another user or users relating to the first primary content A.

Referring to FIG. 12 there is depicted a flowchart 1200 according to an embodiment of the invention relating to a SS-SA wherein secondary content generated by a user under a first license may be de-activated and re-activated under a second license in association with the source of primary content to which the secondary content relates. Accordingly, in step 1205 a user generates secondary content which is associated with the primary content they are accessing and subsequently in step 1220 leaves the first organization, Organization A, which possesses the licenses to the primary content that they are accessing. Upon their departure the curator of Organization A disables the user's rights to the primary content in step 1230 and assigns a new sub-license to a new employee of Organization A.

Subsequently in step 1250 the user joins another employer, Organization B, wherein in step 1260 the curator of Organization B assigns the user a new license to the same primary content. In step 1270 the secondary content previously generated by the user when with Organization A is re-associated with the new license to the primary content so that it is now available to the user in their new employment. It would be evident that the curator of the first organization, Organization A, may limit the secondary content that may be re-assigned, for example, to only their private secondary content and restrict team, project and enterprise. Public content released by the user would be automatically re-associated as it is public and hence available to all licensed users of the primary content to which the secondary content relates.

Now referring to FIG. 13 there is depicted a flowchart 1300 according to an embodiment of the invention relating to a SS-SA wherein secondary content generated by a user in association with primary content may be associated with different levels of publication by the user. Accordingly, the process begins at step 1310 wherein the user logs-in to the software system and/or software application, accesses an item of primary content in step 1320 and generates an item of secondary content in step 1330. Next in step 1340 the user is prompted to select a category of available categories to which to assign the secondary content as. As depicted in flowchart 1300 these categories are "Private", "Team", "Enterprise", and "Public." Based upon the decision of the user then the process proceeds to one of first to fourth category steps 1350A through 1350D wherein the required associations of the secondary content to the appropriate content indices are made and the process proceeds to the respective one of the first to fourth content merging processes 1360A through 1360D associated with the selected first to fourth category step 1350A through 1350D and proceeds to step 1370 and ends.

It would be evident that the user may select two or more categories process step 1340 such as for example "Team" and "Project" so that other members of the user's team can see the secondary content relating to a specific aspect of the "Project." Additionally, electing two categories allows such content to be available to the user when, in this example, the "Project" terminates and the curator removes that access to the users forming the project team. It would also be evident that there are potentially a plurality, N, of categories and that each category may be individually indexed under both the 'Category' index and the name index associated with category "N" and hence these N categories may be searched either collectively or independently.

Figure 14:
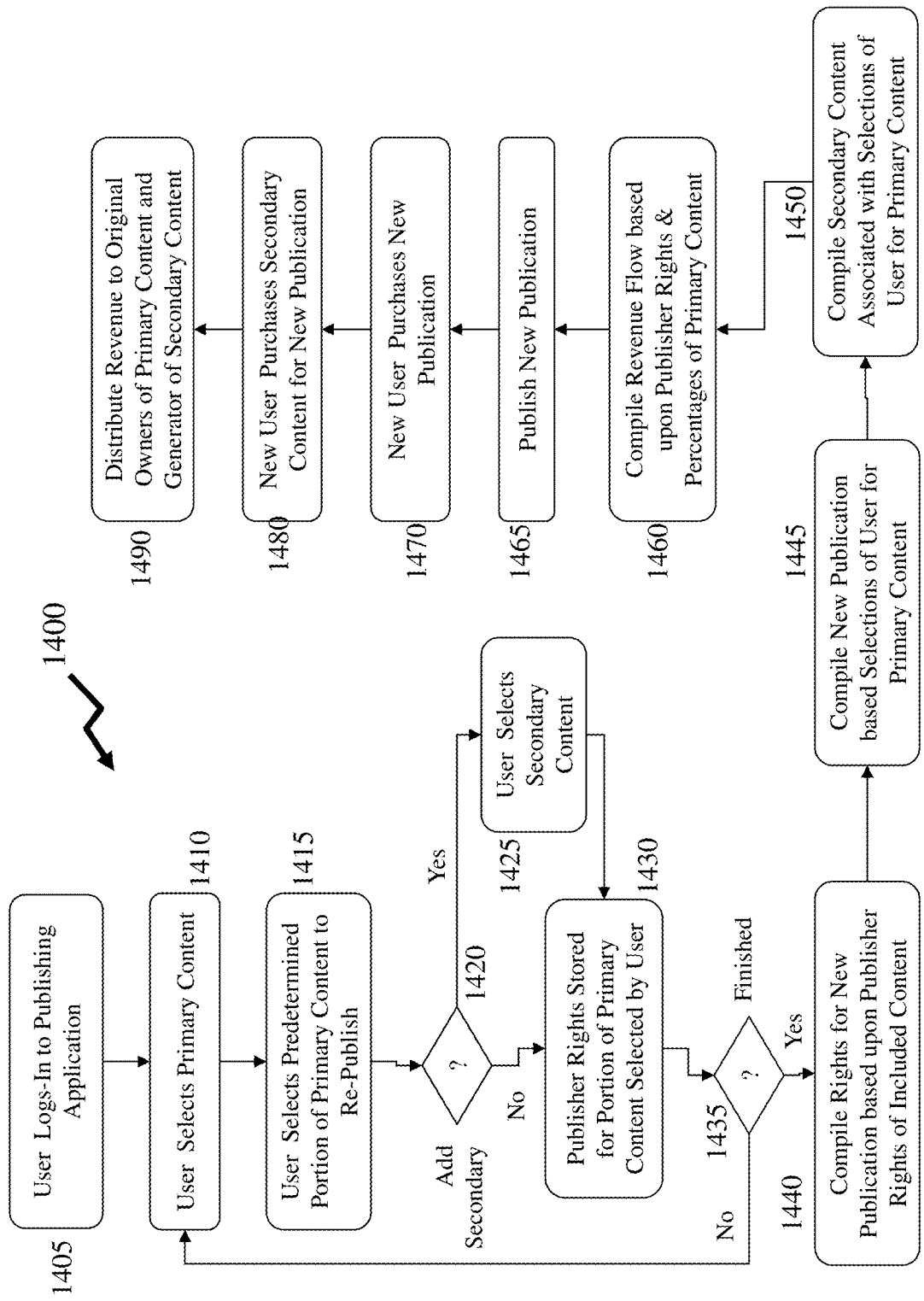
FIG. 14 depicts a flowchart according to an embodiment of the invention relating to a SS-SA wherein multiple sources of primary content may be employed by a user in association with secondary content to generate new primary content for publication.

Now referring to FIG. 14 there is depicted a flowchart 1400 according to an embodiment of the invention relating to a SS-SA wherein multiple sources of primary content may be employed by a user in association with secondary content to generate new primary content for publication. The process begins at step 1405 wherein the user logs-in to the software system and/or software application, accesses an item of primary content in step 1410, and selects in step 1415 a predetermined portion of the selected primary content that they wish to re-publish. In step 1420 the user is prompted whether they wish to add available secondary content to the predetermined portion of the selected primary content wherein if they do the process proceeds to step 1425 allowing user to add selected secondary content and then proceeds to step 1430 which is accessed directly if the user does not wish to add secondary content. In step 1430 the publisher rights associated with the selected primary content are stored and the process proceeds to step 1435. These publisher rights being those associated with the primary content and those selected by the user in respect of the secondary content also being published with the primary content. In step 1435 the user determines whether they are finished selecting primary content wherein if not the process proceeds to loop back to step 1410, otherwise the process proceeds to step 1440 wherein the stored rights for all primary and secondary content are accessed in order to generate and compile the new publication rights for the content to be included in the new publication.

Next in step 1445 the new publication is compiled from the primary content selections of the user and then in step 1450 the secondary content selections of the user are compiled to generated publishable secondary content. The process then proceeds to step 1460 wherein a revenue flow model for the new publication is generated based upon the publisher rights and percentages of the new publication. The new publication is then published in step 1465 such that another user then may purchase a license to the new publication in step 1470 and then may in step 1480 elect to also purchase the secondary content generated by the user previously in step 1425 when they compiled the publication. Then in step 1490 the revenue arising from the new licenses to the primary and/or secondary content is distributed according to the revenue model generated in step 1460.

It would be evident to one skilled in the art that a variant of the above process flow 1400 is one wherein a user generates a new publication for purchase by other users which is solely comprised of secondary content. In this manner a user may generate annotated secondary content relating to primary content and publish this themselves through the SS-SA. One such example is that of well recognized individuals within a particular field issuing essentially their own editorial to a work of primary content or alternatively a publisher may commission specifically secondary content from one or more individuals to act as associated editorial content to their primary content. Accordingly, embodiments of the invention provide publishers with a new distribution mode wherein a user may select one or more editors from a plurality of editors for an item of primary content.

Figure 15:
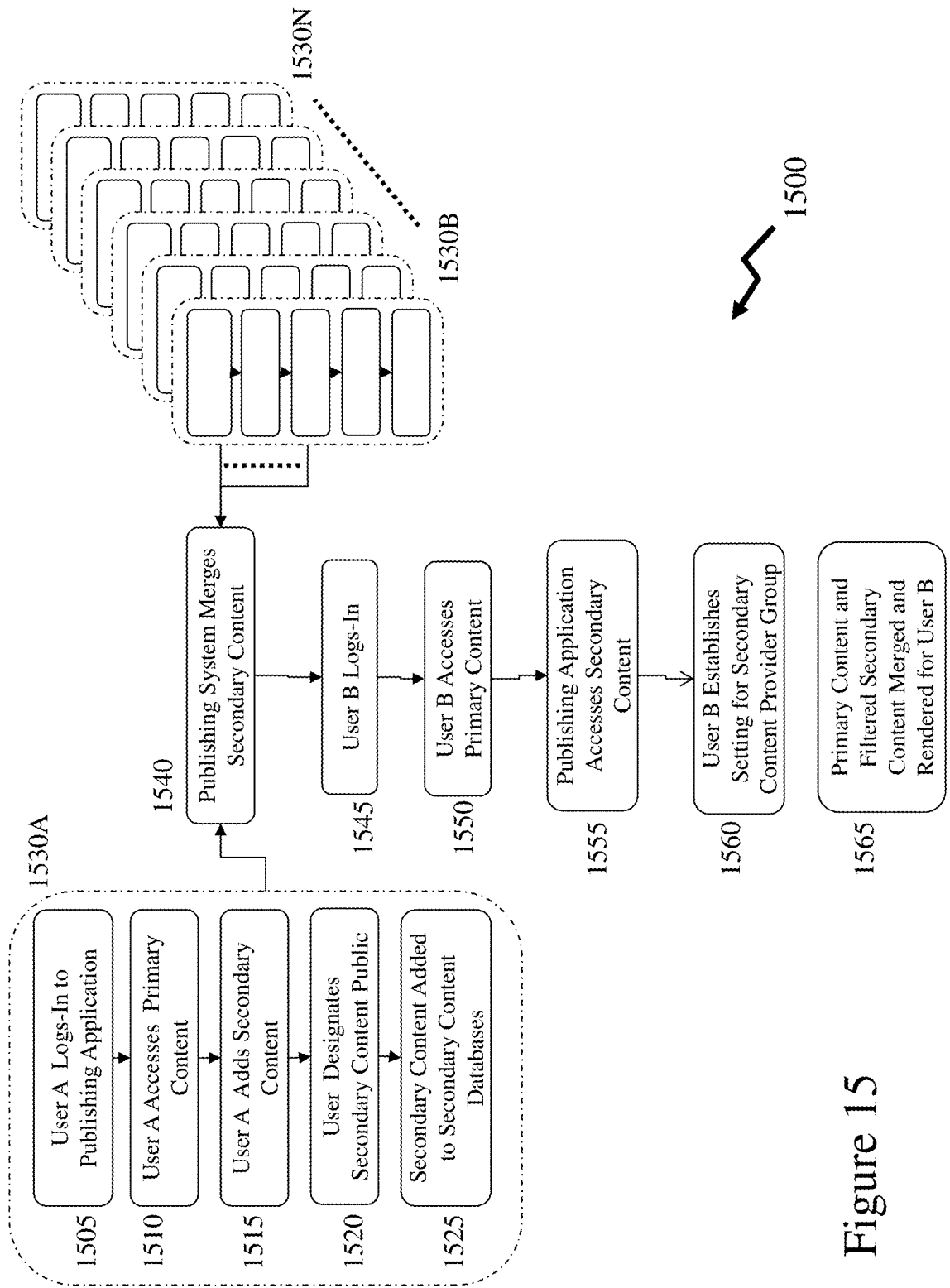
FIG. 15 depicts a flowchart according to an embodiment of the invention relating to a SS-SA with crowd sourcing of secondary content with respect to an element of primary content.

Referring to FIG. 15 there is depicted a flowchart 1500 according to an embodiment of the invention relating to a SS-SA with crowd sourcing of secondary content with respect to an element of primary content. As depicted a first process sub-flow 1530A comprises steps 1505 through 1525 wherein a user logs-in to the software application and/or software system, accesses an item of primary content, adds an item of secondary content, identifies the added item of secondary content as public, and the secondary content is added to the appropriate secondary content databases. Also depicted in flowchart 1500 are additional content process sub-flows 1530B through to 1530N which are similar to first process sub-flow 1530A and relate to secondary content added by multiple other users to the same item of primary content.

The secondary content of the multiple process sub-flows 1530A through 1530N is then merged in step 1540 with the associations to the primary content. Subsequently in step 1545 another user, User B, logs-in and accesses the primary content in step 1550 wherein the SS-SA retrieves the secondary content associated with the primary content in step 1555. In step 1560 User B then establishes settings for the public secondary content group, represented by the users within each of the process sub-flows 1530A through 1530N such that in step 1565 the primary content and filtered secondary content are merged and rendered for presentation to the user.

It would be evident to one skilled in the art that the filtering options presented to the user in respect of the content made public by the users represented by the process sub-flows 1530A through 1530N may include, but not be limited, filtering based upon geographic location, demographic data, psychographic data, date, time, organization(s), affiliation(s), and user identity. Such filtering may be many instances to view annotations with users having particular viewpoints, such as for example in one instance all litigation lawyers employed by the State of Nevada licensed to access "The Federal Mine Safety and Health Act" (Mine Act) in Nevada and in another all commercial litigation lawyers licensed to access the Mine Act in Nevada employed in non-state or non-Government positions.

Accordingly, it would be evident to one skilled in the art that according to embodiments of the invention that according to a preference established by the user secondary content published by third parties, be they members of a team, project, enterprise, public, etc, relating to a section of primary content may be aggregated to the user's secondary content. For example, a user may elect to aggregate all comments relating to Section 28 of the Canadian Patent Act which relate to priority, anticipation, obviousness, and claim date for patent applications rather than those in only Section 28.1 Claim Date, Section 28.2 Anticipation/Novelty, Section 28.3 Obviousness, and 28.4 Priority. Accordingly, the merged aggregated content in this format appears more as a bulletin board, blog or micro-blog associated with these aspects of the Canadian Patent Act. However, this public posting of secondary content and filtering to form an effective bulletin board, blog or micro-blog (depending upon effective rate of annotations from the user group) is unlike other blogs, micro-blogs, and bulletin boards relating to this particular subject matter in that the users posting the public annotations are licensed individuals to the primary content to which their secondary content is associated.

Figure 16:
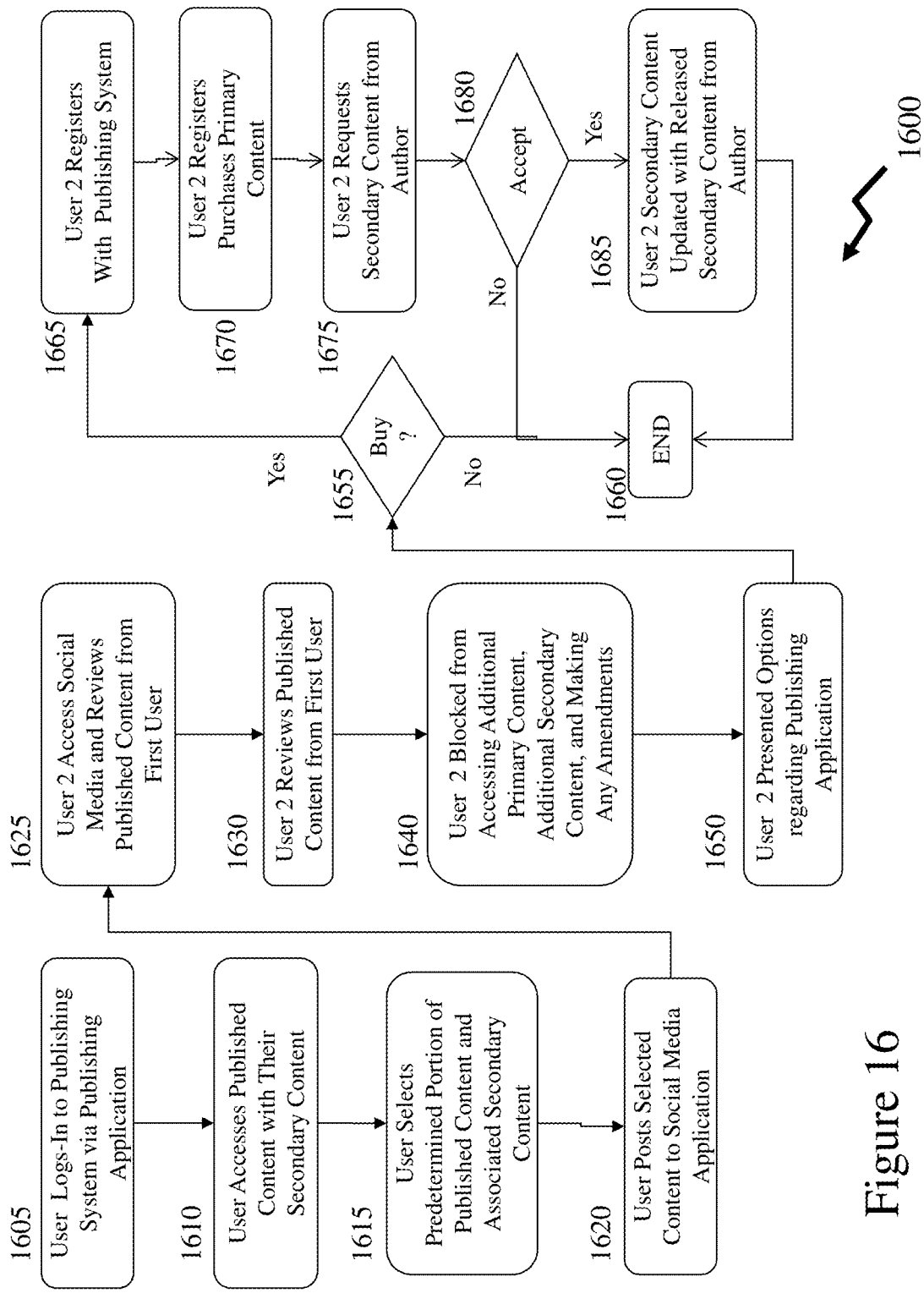
FIG. 16 depicts a flowchart according to an embodiment of the invention relating to a SS-SA wherein a user publishes primary and secondary content to a social media application for subsequent user review.

Now referring to FIG. 16 there is depicted a flowchart 1600 according to an embodiment of the invention relating to a SS-SA wherein a user publishes primary and secondary content to a social media application for subsequent user review. Accordingly, the process begins at step 1605 wherein a user logs-in to the SS-SA, then in step 1610 accesses an item of published primary content together with their secondary content. In step 1615 the user then selects a predetermined portion of the primary content and associated secondary content which they then post in step 1620 to a web based/social media application. Next in step 1625 a second user, User 2, accesses the web based/social media application and reviews the content posted by the user in step 1620 and then reviews this in step 1630.

User 2 is then blocked in step 1640 from accessing further primary content, secondary content, and making any amendments to the information posted by the user, however, the user is presented in step 1650 with options regarding the SS-SA wherein in step 1655 they are presented with the option to purchase the SS-SA. If they decide not to purchase then the process proceeds to step 1660 and ends, otherwise the proceeds to step 1665 wherein User 2 registers with the SS-SA, step 1670 wherein User 2 purchases the primary content, and then in step 1675 requests access to the secondary content posted by the user originally in step 1620 and reviewed by User 2 in step 1625. If the user does not allow User 2 to access then the process proceeds to step 1660 and ends, otherwise the process proceeds to step 1685 wherein the allowed released content from the user is merged with User 2's secondary content and the process ends in step 1660.

Accordingly it would be evident to one skilled in the art that the primary and second content posted to the web based/social media application may be maintained unlike a posting of a link to a website using a URL as the SS-SA maintain the content and what is actually posted to the web based/social media application is a markup language, such as XML or HTML, with links to the stored primary and secondary content. Alternatively, the content itself is posted with restrictions on copying and modifying the primary and secondary content. In this manner a user may engage a wider community with respect to the primary content and their secondary content without requiring addresses for any other user accessing their content. Examples of such web based/social media applications include, but are not limited to, blogs, bulletin boards, user websites, enterprise websites, Twitter™, FaceBook™, LinkedIn™, WordPress, and MySpace™.

Now referring to FIGS. 17A through 17C there are depicted first to third flowcharts 1700A through 1700C according to an embodiment of the invention relating to a SS-SA wherein a publisher publishes primary content which is subsequently purchased by an enterprise wherein a license and sub-licenses are issued and associated to the primary content. Within the descriptions of embodiments of the invention described with respect of FIGS. 6 through 21 there are described a SS-SA which provides an overall content delivery system and the security aspects surrounding the process are discussed. Amongst the desirable features of the distribution system are:

that can supply a fingerprinted version of the primary content for download;

minimal delay between request for primary and/or secondary content and the transfer of data;

no obvious transfer of keys between the system;

encryption of content may occur within the distribution server application;

methods for tracking user metrics;

no requirement for direct association between the users, clients and publishers as well as customers and the marketplace; and no restrictions on membership to the software system and/or software.

Within embodiments of the invention reference may be made to the following:

CogniUser ID, a unique identifier for a user independent of licenses or sub-licenses issued to the user;

CogniSync, the server(s) synchronizing the primary and secondary content generated by publishers, users, etc and providing the merged/rendered content to the user(s);

Market Place, being the portal (Market Place) through which users may purchase a Title, acquire and manage licenses etc; and CogniStore, the server(s) providing the storage repository where primary and second content is stored and which may also be linked to "Market Place", Publisher and/or third party eStores such that these may simultaneously sell eBook "shells" wherein primary and/or secondary content is retrieved from the CogniStore in use.

A user may therefore access the "Market Place" to procure a Title, which within the instance of the descriptions relating to embodiments of the invention is the "shell" of a Title rather than the fill Title. This purchase may also be made through the Publisher, a third party retailer, or a device tied store such as for example Apple's "App Store" for iPhones, iPads etc or the Android Marketplace for other devices. This "shell" contains no actual content at the time of purchase, but the potential to be populated with the primary and/or secondary content once a valid login and product key has been provided to the user. This account provisioning may be through either a physical generation by the publisher via the SyncServer website wherein the key is then transmitted by SyncServer to the user's registered e-mail address or automatically through an tertiary eStore which post success on authorization i.e. credit card transaction, communicates directly with the SyncServer using a unique publisher/product ID to generate the account, which then sends the key to the user's registered e-mail address as a part of the communication with the web service. Once the user has the valid login and product key they then access the software application upon accessing the Title retrieves primary and secondary content from CogniStore which is then rendered, merged and provided to the software application for display to the user.

Figure 17A:
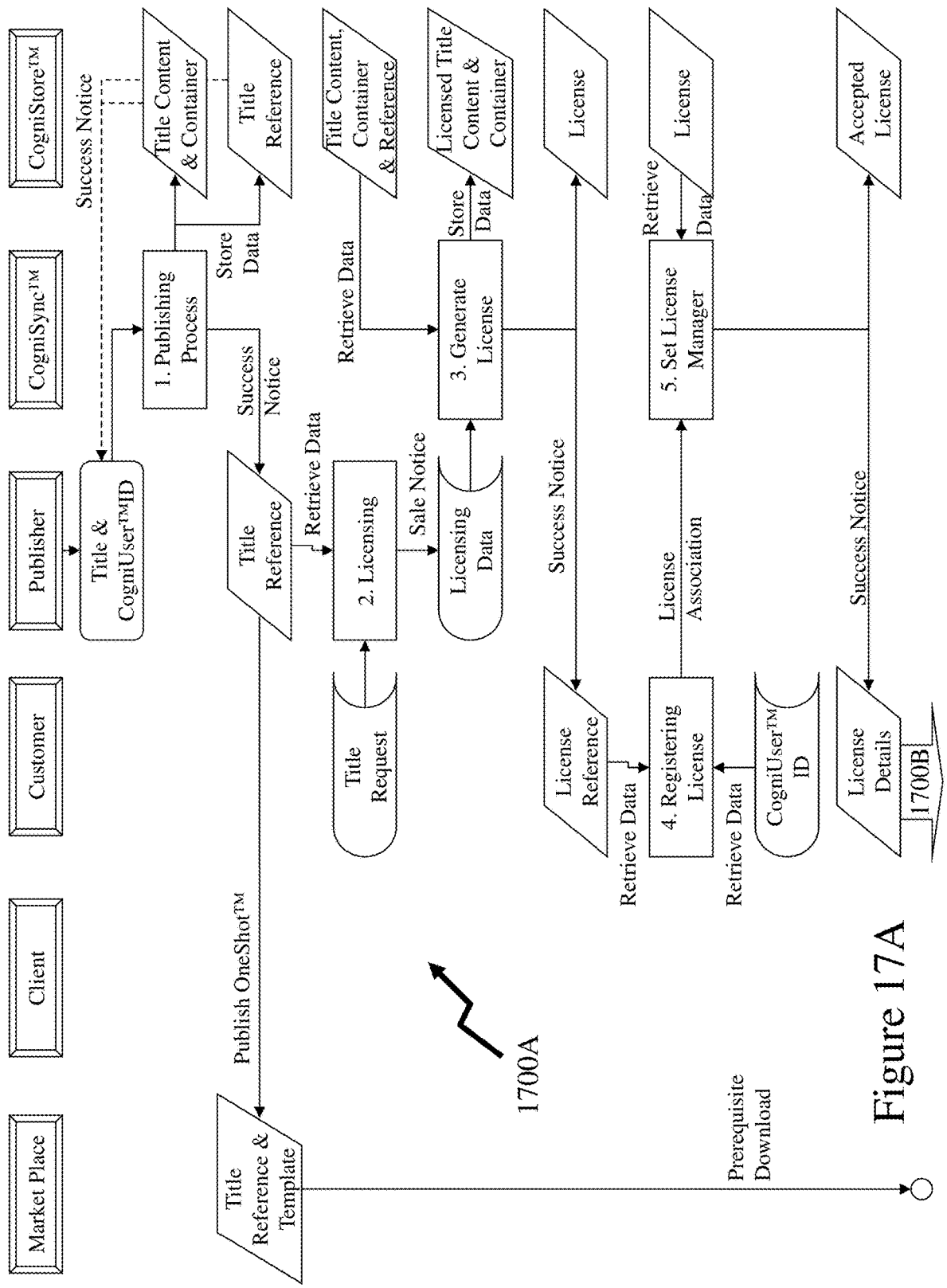
FIGS. 17A through 17C depicts a flowchart according to an embodiment of the invention relating to a SS-SA wherein a publisher publishes primary content which is subsequently purchased by an enterprise wherein a license and sublicenses are issued and associated to the primary content.
Figure 17B:
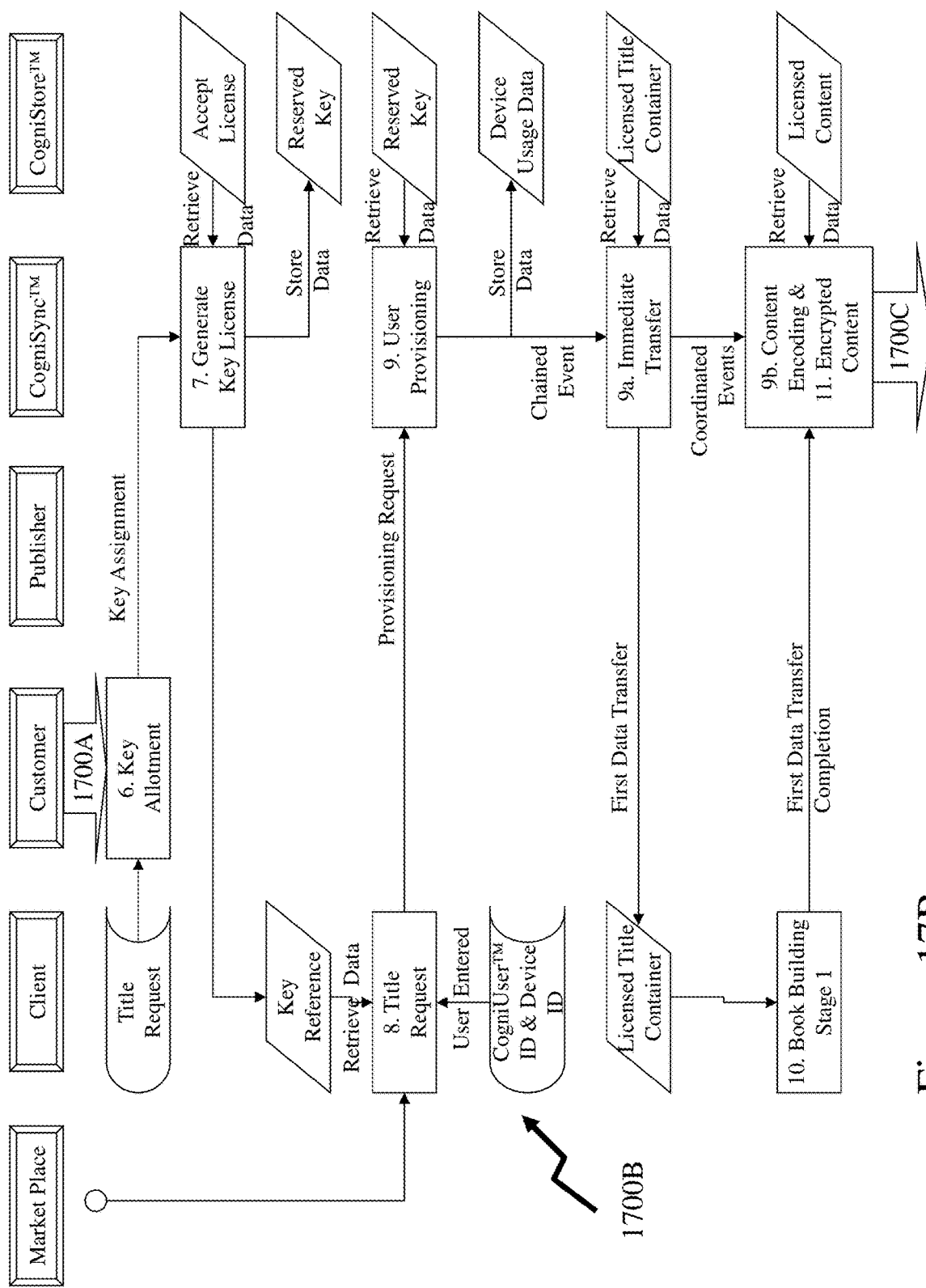
Figure 17C:
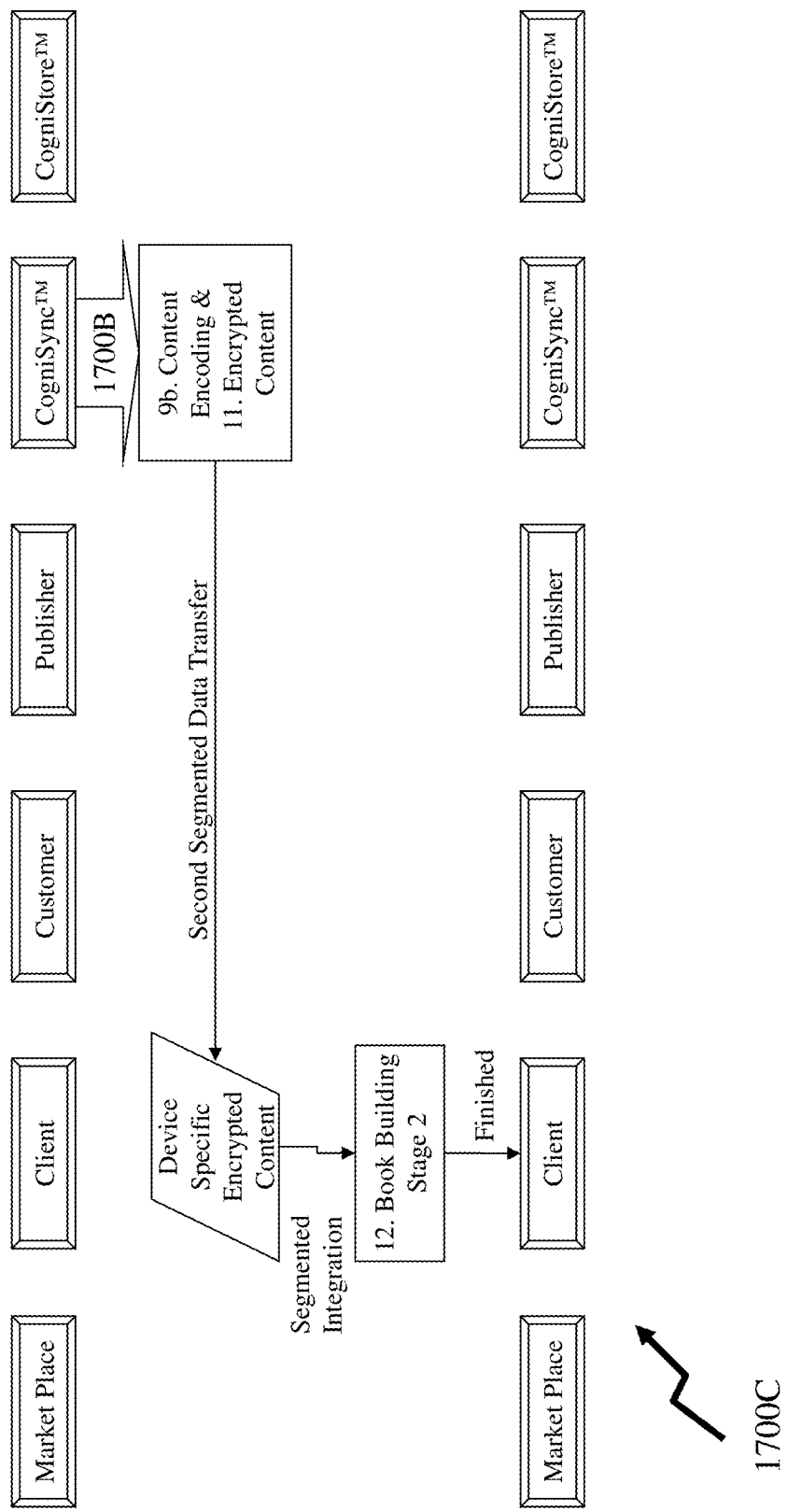

Accordingly, within FIGS. 17A through 17C the main process steps from initial release of a publication (primary content) by a publisher to downloading of the publication by the user (client) are presented. Within first flowchart 1700A five steps are depicted, these being:

1. Publishing Process: wherein the Title is submitted to CogniSync using a valid CogniUser ID for that Publisher publishing the Title. During this stage the information is divided into four distinct parts and stored within appropriate locations on the servers of the software system. These being:
   i. Title Reference—generated and given to all locations;
   ii. Title Content—the primary content is generated and stored on CogniStore;
   iii. Title Container—generated and stored on CogniStore;
   iv. Title Template—packaged with Title Reference and stored on the Market Place 2. Licensing: is performed or authorized using the Title Reference and a Title Request for a license set (which can consist of a single license) could take place through a number of mechanisms:
   1) based on an "analog" process, i.e. salesperson reports a sale back to the billing team, the publisher's representative accesses CogniSync through an interactive dashboard and enters in all of the elements required to create a license, including the license set contact's e-mail address. CogniSync creates all of the necessary license set information and send a welcome message to the contact (curator).
   2) similar to above, except based on the billing representative's entry of the sale, an automated process transmits required information to the CogniSync web service on a secure link (along with the publisher's ID and password information). CogniSync creates all of the necessary license set information and send a welcome message to the contact (curator)
   3) the sale is based on a digital process, i.e. a publisher or reseller's web store) which collects the necessary information. The webstore then triggers an automated process which transmits required information to the CogniSync web service on a secure link (along with the publisher's ID and password information). CogniSync creates all of the necessary license set information and send a welcome message to the contact (curator)

In all cases, the curator then uses a link and instructions within the message to assign the license. Accordingly, it would be evident to one skilled in the art that embodiments of the invention therefore support sales and licensing being issued by the publisher (e.g. Thomson Carswell, Academic Press, Random House, and HarperCollins), the SS-SA, or another third party (e.g. Amazon™, Chapters Indigo™, Barnes & Noble™).

3. Generate License: uses the Licensing Data in conjunction with the Title Content and Title Container to generate a customised version of the Title Content and Title Container that has fingerprinting embedded within both structures where the customization relates to one or more aspects of the Licensing Data. In some embodiments of the invention this part of the process may be transparent to both the user and the publisher by providing security through obfuscation, in others encryption, encoding and other obfuscation techniques are utilised. Generating the license additionally creates the License for internal tracking and an external License Reference. The external License Reference is then sent on behalf of the publisher to the Customer's specified email(s) used when registering their account and may be an individual user or an enterprise's curator for example.

4. Registering License: is the next step which taken by the Customer supplying CogniSync™ with the CogniUser™ ID of the Curator at the time of acceptance of the License, thereby accepting delivery of the content. There is a differentiation according to embodiments of the invention between a license set (which contains one or more licenses) and individual licenses (which are granted to a user) which may be considered in steps 4 through 7 inclusive.

When a sale takes place the curator contact, which may end up being the same person as the user, receives an e-mail from the CogniSync system with instructions, a link to the CogniSync dashboard, namely the control panel for a content management system, and a license set key (between steps 3 and 4). The curator contact then uses this information to accept the license set and associate it with their CogniID (step 4). If necessary, they setup a new CogniID, along with their organization during this process of which they are granted "Curator" status for that organization wherein account consolidation tools may be provided (step 5). They can now assign the license(s) to users that they create through the dashboard, they are automatically the first user, ensuring that the user's contact information is indicated (step 6). At this point in time, the CogniID information for the user's is not shown, it is not populated (and may not exist) until the user accepts the license between steps 7 & 8.

5. Set License Manager: is the following process in which CogniSync officially delivers the License to the Client recording the association, and allowing the Publisher to track delivery as the Accepted License. Additionally, the License Details are now sent to the CogniUser ID for confirmation.

Within second flowchart 1700B a further five steps are depicted, these being:

6. Key Allotment: is the next step for a Curator who has successfully received the License Details to assign Client access to the Title. The Customer Curator supplying the Client must then register the Key Assignment with CogniServ™. Within the specification and description where License Details are referenced that this may be associated with a License Set and that a Key may be associated with a License.

7. Generate Key Reference: is the software system process, for example as operated by CogniLore Inc., in which the Key is associated with the Customer's Accepted License and the use of the Key is stored as a Reserved Key. Additionally, the Key Reference is sent on behalf of the Customer to the Client's identified email account(s).

8. Title Request: is the stage where the Key Reference is used by the Client who has already retrieved from the appropriate Market Place the Title Reference and its associate Title Template, who can then contact CogniSync using the Title Template which will supply the Device ID and then require the user to supply a CogniUser ID. For clarity, the Key may not be entered through the software but may be entered through the CogniSync dashboard. An e-mail may be sent by the CogniSync system to the user containing instructions, a link to the CogniSync dashboard, and their Key Reference. The title is accepted through the Cogni Sync dashboard, and not from within the software.

9. User Provisioning: starts with the confirmation of the Reserved Key and stores the Device Usage for later use and then two sub-processes are started.
   A. Immediate Transfer: is used so that the user is presented with low delay or wait period in accessing initial content; and
   B. Content Encoding: requires the Device ID so that the encryption key can be derived and begins queuing data for transmission in process in step 11 Encrypted Content Transmission.
10. Book Building Stage 1: where the Title Template integrates the License and Title Container into itself and then reports back to Cogni Sync that it is ready to receive the Encrypted Content.

Within third flowchart 1700C a further two steps are depicted, these being:

11. Encrypted Content Transmission, which is performed in conjunction with continuation of 9B Content Encoding: as the title of this process implies there is both an active Encoding process going on as well as the transmission of parts as they are completed. This allows embodiments of the invention to exploit a buffering process and ensure that there is a constant flow of data and perceivable progress to the user.
12. Book Building State 2: wherein individual Device Specific Encrypted content is added to the Content Template eventually completing the entire process and providing the Client with the completed Title ready for use.

Figure 18:
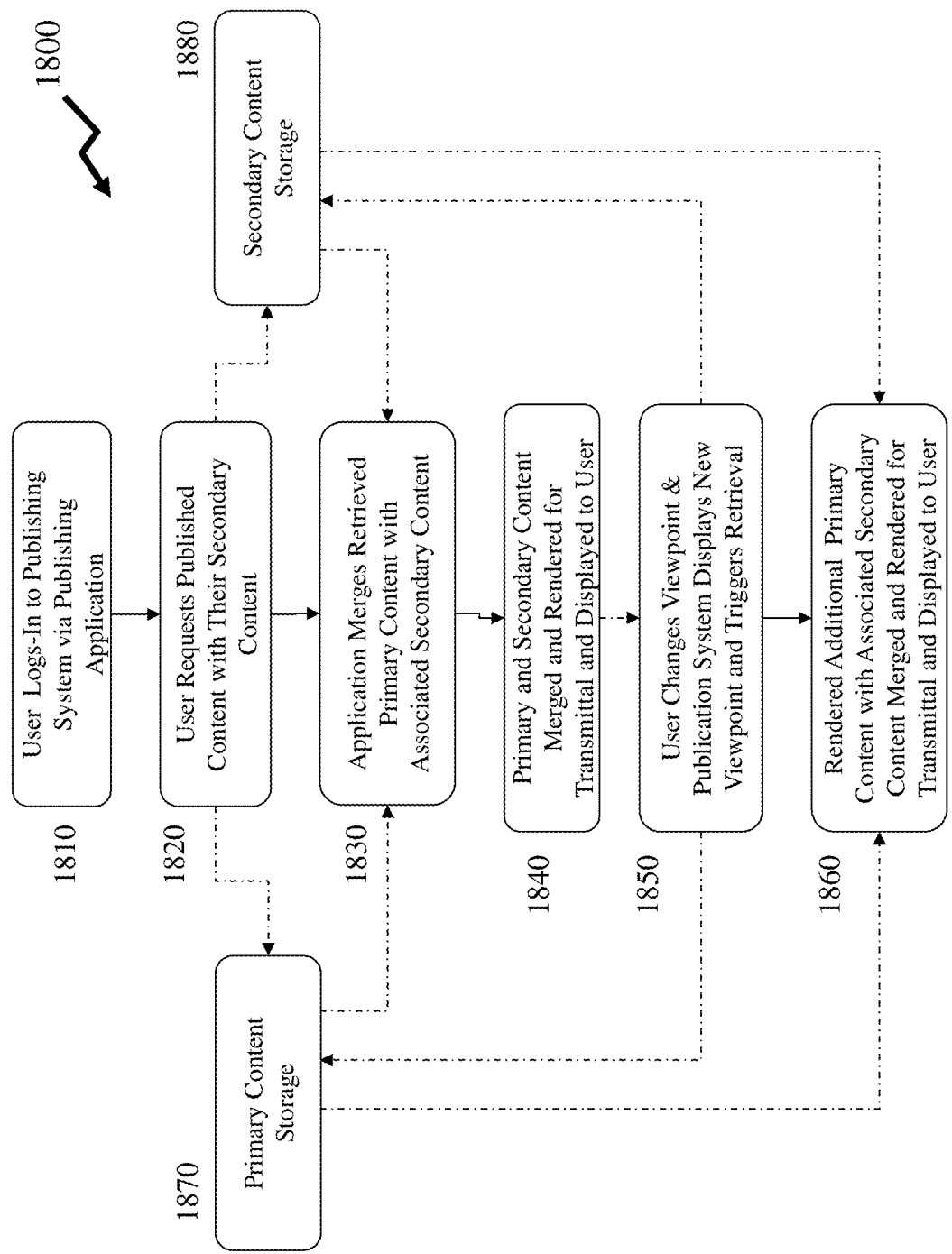
FIG. 18 depicts a flowchart according to an embodiment of the invention relating to a SS-SA relating to the rendering of merged primary and secondary content to a user.
Figure 19:
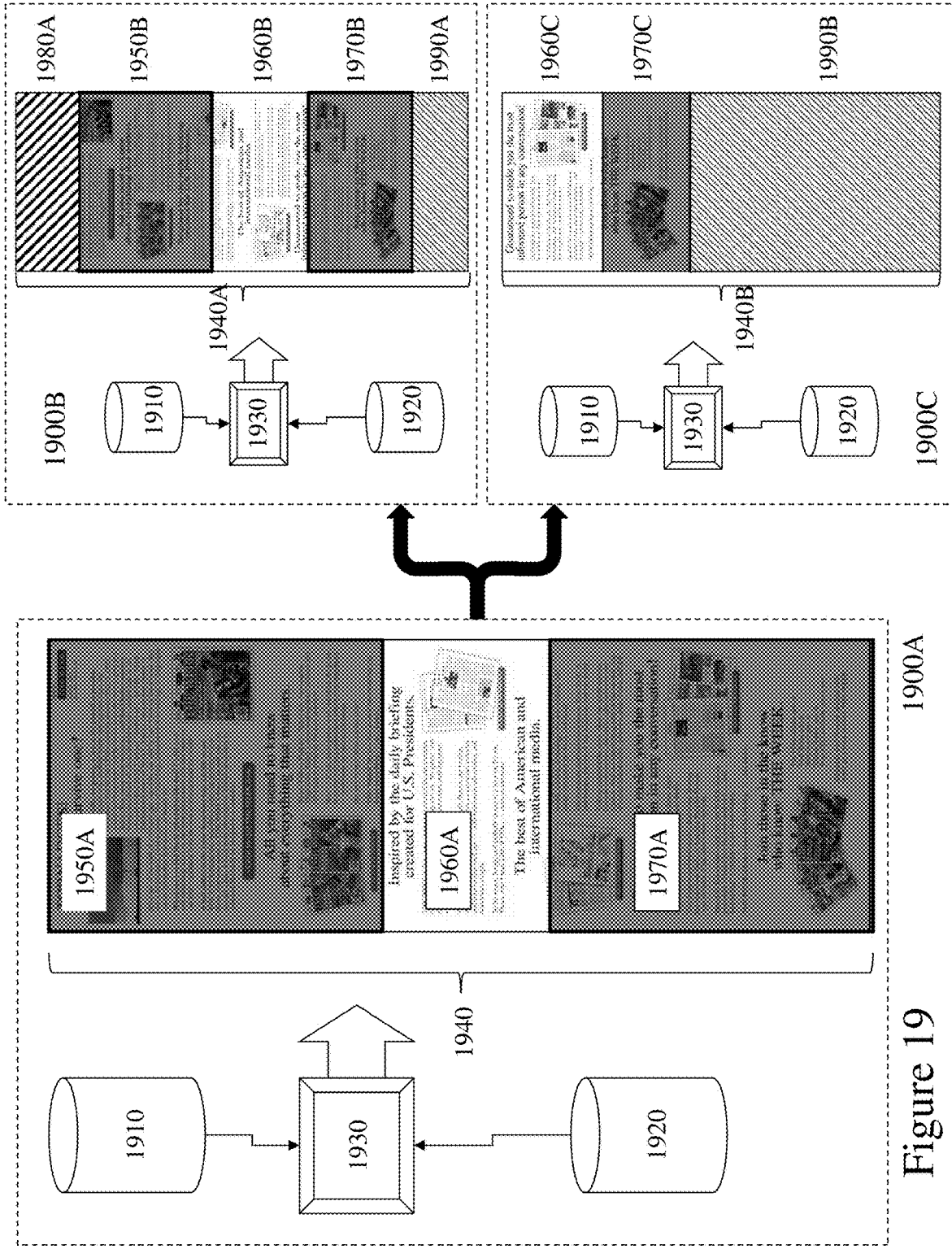
FIG. 19 depicts dynamic migration of a user's viewing window within retrieved merged primary and secondary content in response to a characteristic of the user according to an embodiment of the invention.

As described within respect to embodiments of the invention in respect of FIGS. 6 through 21, and particularly FIG. 19, the primary and secondary content are provided to the user in a manner supporting the scrolling of the combined content by the user such that unlike other prior art applications the discontinuity in scrolling is minimized as the content retrieved and rendered is adjusted according to the actions of the user. Accordingly, such embodiments generally comprise the primary content remaining at the software system servers and a predetermined portion of the merged primary and secondary content being provided to the user such as described below in respect of FIGS. 18 and 19 and then removed upon the user closing the selected title. Such an approach supporting, for example, reduced memory requirements for devices the user uses to access the content, provide flexibility in users accessing the content from any electronic device, and reduction in the content released as complete copies of the primary content are not released. It would be evident to one skilled in the art that alternatively the complete primary content may be provided to the user and accordingly the user license for a particular primary content is a predetermined limited number of licenses tied to particular electronic devices, i.e. in a manner similar to that employed in Apple iTunes™.

It would be apparent to one skilled in the art that according to an embodiment of the invention this simplified delivery of a title to a single user shows that they act as both curator and user. From their perspective the process flow may be perceived as:

I receive an e-mail from the CogniSync server announcing my new purchase, which contains a license set key, a link to the Cogni Sync Dashboard, and instructions;
I click on the link to access the Cogni Sync Dashboard;
I login to my CogniID account, or create a new CogniID account;
I click on the register new license within the CogniSync Dashboard and enter my license set key. This activates the license set, the details of which I can now see within the CogniSync Dashboard in an area titled "My License Sets", and am prompted if I want to associate a license key with my CogniID;
I click on "Yes" and the relationship is made;
The purchased Title now appears under another area entitled "My Titles", along with the Title restrictions. Clicking on the Title loads additional information relating to the Title. I al also provided instructions on how to acquire the software, for example single user or library version, to download the title to the various devices;
I can now assign the other keys purchased (if any) to other users via the "My License Sets" interface, entering their e-mail contact information. The users are added to a list, which also includes their status (which is Pending until it has been claimed) and their CogniID (which is blank until populated when claimed);
When each assignment of the key is confirmed, a user welcome e-mail is sent to the user with instructions, a link to the CogniSync Dashboard, and their License Key. The user accesses the CogniSync Dashboard as above and enters the License Key. This activates the product for them under "My Titles". The site now provides them with information on downloading the software.

It would also be evident to one skilled in the art that the licensing approach described in respect of FIG. 17 allows a curator to purchase multiple licenses for an enterprise, for example a law firm, and then assign licenses to lawyers, administration staff etc. The curator may then terminate licenses and/or re-assign them to other lawyers, administration staff in dependence upon staff changes, requirements etc. Further, as the SS-SA tracks the usage of the users against the licenses it provides the curator with increased metrics with which to manage the licenses required within their enterprise and accordingly their budget plus justification for the licenses purchased through usage data. It would also be evident to one skilled in the art that licenses may also be established according to embodiments of the invention for either full or partial primary content with or without published secondary content with predetermined limited validity so that a curator may adjust licenses to reflect short-term requirements and/or license primary content to address particular requirements of the enterprise.

It would also be evident to one skilled in the art that embodiments of the invention with respect to licensing content, issuing sub-licenses, and re-assigning licenses may be applied to alternate forms of content other than those primarily considered within this specification for electronic publications. As the primary content may be any multimedia content then the licensing of content, issuing sub-licenses, re-assigning licenses, etc may be applied to audio content, audiovisual content, and multimedia content. Examples of such content including for example music, films, videos, computer generated graphics, animation, computer generated animation, and games.

It would also be evident to one skilled in the art that the preceding description in respect of FIGS. 17A through 17C is described with respect to a single title publishing solution. However, it would be evident that the method described above in respect of FIGS. 17A through 17C also relates to a SS-SA managing a library of titles for at least one of a publisher, a retailer, a curator, and a user. Accordingly, for example, a publisher may provide multiple titles which are published and some of which are purchased with single licenses and others with multiple licenses. Likewise, a curator may manage multiple titles some of which are purchased with single licenses and others with multiple licenses or a user may purchase licenses themselves, therefore making themselves a curator for that title, as well as being allocated licenses for other titles from a curator. Hence, the SS-SA may include support for a library interface.

For example, according to an embodiment of the invention, a software package is posted to a distributing marketplace for an appropriate platform, for example Apple Application Store for the Apple iOS operating system, Android Marketplace for Google's Android operating system, and Publisher website for Microsoft Windows. The software package contains an application and an e-book title shell. When launched, the software requests the user's CogniID information and then checks to see if they have been granted access to the associated title. Upon validation of the user access rights the e-book title shell is populated with the predetermined contents which may, for example, be the entire e-book or the first chapter of the e-book.

According to another embodiment of the invention, a software application for library is purchased from a software provider directly or through a distributor such as one of the marketplaces listed above and installed to a device. The library software then requests the user's CogniID information and checks to see which there are titles that they have access to. Optionally a list of titles may be presented to the user allowing them to determine which ones should be downloaded to a particular device, with a function existing within options to retrieve and update this list. The software application then downloads the e-book title shell for each, or each selected, title, and then sequentially populates the title shell(s) with the predetermined portion of the e-book contents determined for e-book.

According to another embodiment of the invention the software system and/or software there is a "blind forward" and no owner relationship between the Client (User) and Customer. Within another scenario the Customer (Curator) would review the licenses and would make a change in the license assignment, including the contact information (e-mail). This would both cancel the first license, which would remove the title from the first licensee on the next product access to Cogni Sync, the details of which would be available to them in their 'My Titles' section of the CogniSync Dashboard, and would send a welcome message to the new user with links and instructions such as described above wherein they would procure the software, setup/login to their CogniID account, register their product via the CogniSync Dashboard etc as described above. If, the user already had access to a particular title, the CogniSync Dashboard would present them with a set of options, including for example accepting the new title assignment which would break the existing license relationship and notifying the curator of the current title that a license has been freed, and rejecting the new title assignment and notify the assigning curator that the title assignment was rejected.

Alternatively, the encryption described in respect of content transmittal within FIG. 17 may be implemented through different protocols including for example, exploiting Hypertext Transfer Protocol Secure (HTTPS) to encrypt automatically content data being transmitted from CogniSync™ to the Client and encrypting this content data on the Client's device automatically with the reader software upon receipt so that the content is encrypted on the Client's device. Optionally, containers for data transmission, such as Licensed Title Container may be generated dynamically rather than being stored within CogniStore™. Optionally, the DeviceID rather than being employed to lock the Title to a specific device may be used for analytics.

Now referring to FIG. 18 depicts a flowchart 1800 according to an embodiment of the invention relating to a SS-SA relating to the rendering of merged primary and secondary content to a user. Accordingly, the process begins at step 1810 wherein a user logs-in to the SS-SA and then in step requests a Title in step 1820 wherein the SS-SA retrieves content from the primary content storage 1870 and secondary content storage 1880 which is them merged in step 1830, rendered in step 1840, and presented to the user. Next in step 1850 the user elects to change their location (viewpoint) in the Title which as depicted below in respect of FIG. 20 triggers the retrieval of additional primary and secondary content from the primary content storage 1870 and secondary content storage 1880 respectively which is then merged and rendered wherein it is transmitted to the electronic device and displayed to the user.

It would be evident to one skilled in the art that the process steps 1850 and 1860 may be repeated as the user browses, reads, or moves through the Title. Additionally, secondary content may be added as described in respect of the embodiments of the invention described in respect of FIGS. 6 through 21. Now referring to FIG. 19 there is depicted a dynamic migration of a user's viewing window within retrieved merged primary and secondary content in response to a characteristic of the user according to an embodiment of the invention to provide improved continuity of the user movement through the Title over the prior art. Accordingly, in first view 1900A a user is accessing the software system 1930 from an electronic device, not shown for clarity, wherein the software system 1930 retrieves content 1940 from the primary content storage 1910 and secondary content storage 1920. Of the content 1940 retrieved, merged, rendered, and transmitted to the user's electronic device the viewer is presented with window 1960A representing that portion of the merged and rendered content that can be displayed in the display of the user's electronic device. The remainder of the content 1940 is depicted by prior portion 1950A and subsequent portion 1950B representing portions of the content that precede and follow the content displayed within the window.

Next in second view 1900B the user has elected to scroll through the content such that the electronic device now displays first new window 1960B to the user, being part of the subsequent content. Accordingly, the software application on the electronic device transmits a request for additional content to the software system 1930 which triggers additional requests to the primary content storage 1910 and secondary content storage 1920. This is merged, rendered and transmitted to the electronic device as new content 1990A whilst the software application deletes dumped portion 1980A, and displays second window 1960B. Remaining portions of the prior portion 1950A and subsequent portion 1950B in first view 1900A are depicted as first and second residual portions 1950B and 1970B respectively.

Second view 1900B representing a slow scroll by the user through the Title, whereas third view 1900C represents a faster scrolling process. Accordingly, the software application on the electronic device transmits a request for additional content to the software system 1930 which triggers additional requests to the primary content storage 1910 and secondary content storage 1920. This is merged, rendered and transmitted to the electronic device as new content 1990B whilst the software application deletes all preceding portions of the content and displays third window 1960C to the user. In this third view 1900C there is no remaining portion of the prior portion 1950A and subsequent portion 1950B in first view 1900A is depicted as third residual portion 1970C. Accordingly, as the user increases an aspect of scrolling, such as for example, speed of finger motion on a touch sensitive display or multiple repeated scrolling motions, the software application adjusts the requests to the software system and essentially slides the viewer window, depicted by first to third windows 1960A through 1960C respectively, within the retrieved content 1900.

It would also be evident to the user that the amount of content retrieved between first, second and third views 1900A through 1900C respectively may be varied according to characteristics of the user's scrolling as well as in dependence of other factors including but not limited to, device display characteristics, characteristics of rendered content in the direction of scrolling, and transmission data rate between the software application and the software system.

Figure 20:
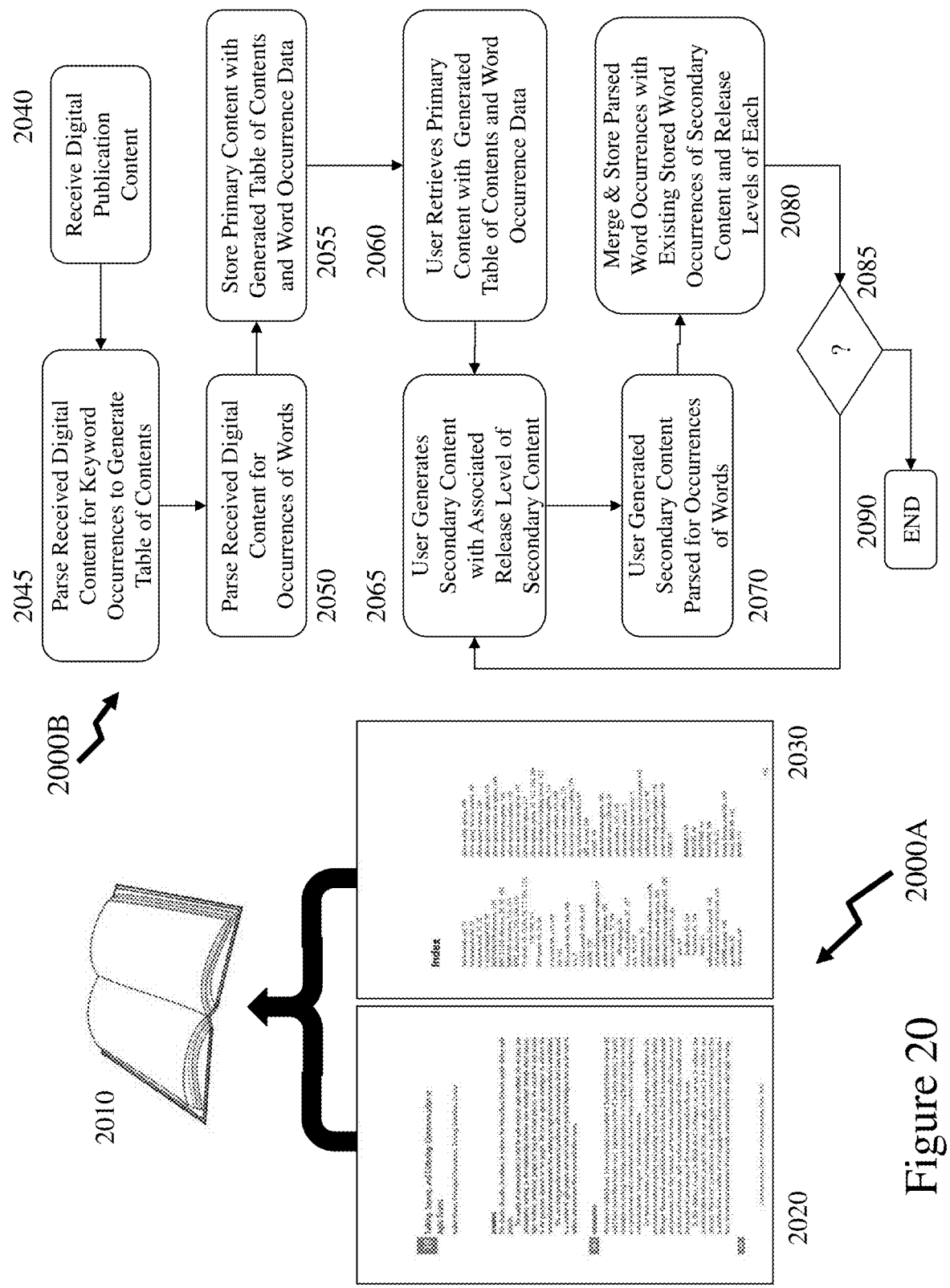
FIG. 20 depicts an index according to the prior art together with a flowchart according to an embodiment of the invention relating to a SS-SA for indexing primary content and subsequently generated index of secondary content.

Now referring to FIG. 20 there is depicted an index 2030 according to the prior art together with a flowchart 2000B according to an embodiment of the invention relating to a SS-SA for indexing primary content and subsequently generated index of secondary content. Referring to first view 2000A a book 2010 according to the prior art is depicted wherein this comprises the body 2020 of the book 2010 and index 2030. Within the prior art the index 2030 is generated by the author and/or publisher and comprises those aspects of the body 2020 of the book 2010 that the author and/or publisher defined. Within electronic content according to the prior art, not shown, such as PDFs, EPUB based eBooks, websites, word processors etc an index may be generated in a similar manner using terms defined by the author and/or publisher.

Additionally, such electronic content presentation tools provide the user with a variety of text based search tools for particular words or phrases. However, such searches are performed discretely and in isolation each time the user elects to perform them. Flowchart 2000B presents an indexing method according to an embodiment of the invention which begins with the software system receiving a new title for publication. In step 2045 this new primary content is parsed for keyword occurrences to generate a table of contents followed by step 2050 wherein the primary content is parsed for occurrences of words to generate an index wherein the resulting occurrences of these keywords and words are stored within a data file associated with the primary content. In according with an embodiment of the invention parsing the primary content for words may be performed for every word and the resulting data file contains an entry for the word together with location data within the primary content for every occurrence of the word. An exemplary database of word occurrences for primary content being provided in Table 1 below.

TABLE 1

Exemplary Database of Parsed Word Occurrences in Primary Content

| Anticipation | 50; 135; 275; 2450; 11024 |
| Canada | 1; 25; 75; 466 |
| Novelty | 110; 450; 3455; 10866; 14602 |
| Patent | 2; 26; 80; 100; 130; 2440; 3452; 10870; 11023 |
| Trademark | 194; 360; 520; 860; 1187; 2046 |

Table 1: Exemplary Database of Parsed Word Occurrences in Primary Content

Subsequently, in step 2060 a user retrieves the primary content by obtaining a license to the Title together with the generated table of contents and index data and then subsequently in step 2065 the user generates secondary content in respect of their activities with the primary content. Accordingly, the SS-SA parses in step 2070 the user generated secondary content and in step 2080 the occurrences of words within the secondary content are added to a database of word occurrences associated with the secondary content. In step 2085 the process determines whether the user has finished with the primary content, which if they have results in the process proceeding to step 2090 and stopping, otherwise it loops back to step 2065.

It would be evident to one skilled in the art that accordingly the user has access to index data for each of the primary and secondary content. It would also be apparent that the table of contents may be generated as discussed above in respect of FIG. 11. Additionally, as the search index has occurrence locations for all occurrences of words within the primary and secondary content new searches are enabled that would otherwise not be possible within prior art approaches to searching such as shown below in (1) wherein the search only returns results when the words "Patent" and "Canada" occur within 3 words of one another. Modified search (2) further requires that "Patent" occurs within 3 words of "Canada" and after it. It would also be evident that activities of the user such as highlighting and annotating may be identified through the word occurrence data such as outlined below in respect of (3), (4) and (5) respectively.

$$(\text{Patent}) \text{ and } (\text{Canada}) \text{ and } [|L_{(PATENT)} - L_{(CANADA)}| < 3] \quad (1)$$

$$(\text{Patent}) \text{ and } (\text{Canada}) \text{ and } [0 < -3 \leq |L_{(PATENT)} - L_{(CANADA)}| < 0] \quad (2)$$

$$\text{Highlight}\{\text{Blue,Static,Start}[\text{Patent},80],\text{Finish}[\text{Anticipation},135]\} \quad (3)$$

$$\text{Annotate}\{\text{Text}(01\text{-}01\text{-}2012;20\text{:}15\text{:}20),\text{BEG}[\text{Patent},80],\text{END}[\text{Anticipation},135],\text{PVT}\} \quad (4)$$

$$\text{Annotate}\{\text{Multi}(01\text{-}01\text{-}2012;20\text{:}17\text{:}55),\text{BEG}[\text{Patent},80],\text{END}[\text{Anticipation},135],\text{PBC}\} \quad (5)$$

In the examples shown the annotations (4) and (5) are associated with a portion of the primary content defined by an occurrence of "Patent" at the $80^{th}$ location and "Anticipation" at the $135^{th}$ location. In (4) the annotation is noted as "Text" generated on Jan. 1, 2012 at 20:15:20 and being "Private" (PVT), whilst in (5) the annotation is noted as "Multi" representing multiple media and generated on Jan. 1, 2012 at 20:17:55 and being "Public" (PBC). It would be evident to one skilled in the art that many other formats for the database, entries therein, and identifications of annotations, highlights, etc may be possible without departing from the scope of the invention.

Figure 21:
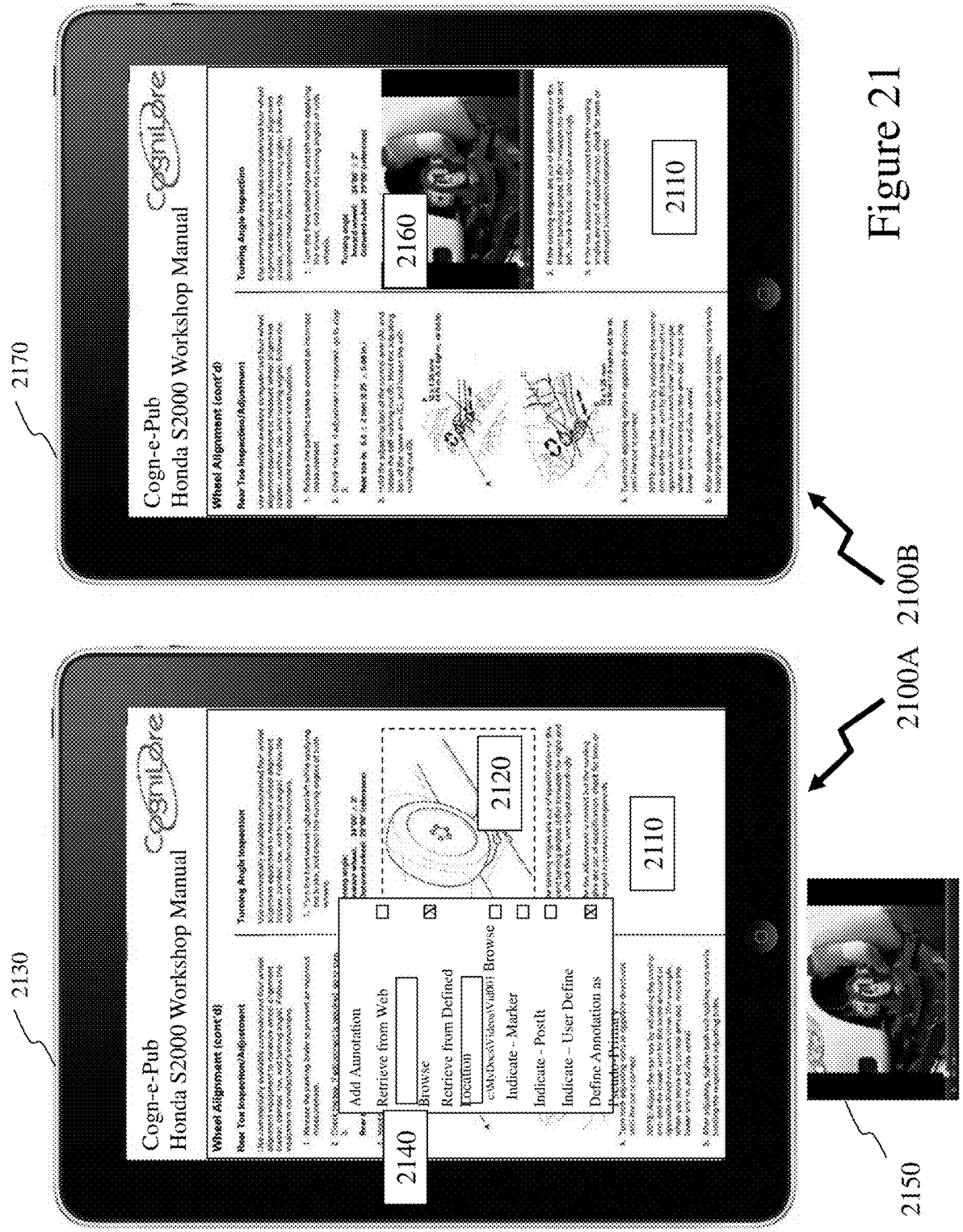
FIG. 21 depicts an example of a user adding an annotation as a pseudo-primary element of a primary content so that the secondary content is displayed to subsequent users as if it was an element of the primary content when published by the user.

Now referring to FIG. 21 there is depicted an example of a user adding an annotation as a pseudo-primary element of a primary content so that the secondary content is displayed to subsequent users as if it was an element of the primary content when published by the user. Within first view 2100A an electronic device 2130 is shown with a page 2110 from a "Honda S-2000 Workshop Manual" within an application "Cogn-e-Pub" from CogniLore Inc. Page 2110 relating to wheel alignment and containing an image 2120. The user has elected to add an annotation and is accordingly presented with pop-up 2140 wherein they select an item to add from the web or a defined location, in this instance from a location on their C: drive, and may define the annotation as being "pseudo-primary". The video the user wishes to add being denoted by video image 2150 in first view 2100A.

Another user subsequently accessing the primary content on another device 2170 is presented with page 2110 but now the image is hidden by embedded video annotation 2160. It would be evident to one skilled in the art that a user creating the secondary content with the pseudo-primary content may have different rights to other users who subsequently access the primary content with the user generated secondary content. For example, the primary content may be a manual released by a manufacturer, in FIG. 21 Honda, relating to a product, S-2000, but that the licensee, e.g. US Autoparts Inc, WalMart™, and Meineke™, wishes to provide its employees with a video of performing the wheel alignment rather than the image within the manufacturer released content. Other scenarios would be evident to one skilled in the art that do not depart from the scope of the invention.

Specific details are given in the above description to provide a thorough understanding of the embodiments. However, it is understood that the embodiments may be practiced without these specific details. For example, well-known processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system comprising:
   a plurality of servers connected to a communications network comprising at least a first processor for executing a first software application and a first memory for storing:
   the first software application;
   primary content relating to a publication which cannot be accessed directly or modified by any user of a plurality of users executing a second software upon an electronic device to render at least the primary content to the user of a plurality of users;
   secondary content relating to the publication but not forming part of the publication; the second content comprising a plurality of secondary content items, each secondary content item generated by a user of a plurality of users in response to viewing the primary content within the second software application upon the electronic device and associated by the user of the plurality of users with a specific location within the primary content; and
   a database comprising licensing data relating to the primary content, the secondary content, and the plurality of users; wherein
   the first software application in response to a request received from an electronic device associated with an individual via the communications network performs the steps of:
   verifying a license of the individual in dependence upon license data received from the electronic device as part of the request and the licensing data, the license relating to permission to view the rendered combined primary content and the secondary content of the individual and a predetermined subset of the plurality of users; and
   upon verifying the license of the individual the first software application performs the additional steps of:
   retrieving a predetermined portion of the primary content to which the individual is authorised in dependence upon at least their verified license;
   retrieving a first predetermined portion of the secondary content, the first predetermined portion of the secondary content being that associated with the retrieved predetermined portion of the primary content generated by the individual;
   retrieving a second predetermined portion of the secondary content, the second predetermined portion of the secondary content being that added by a predetermined subset of the plurality of users whose secondary content the individual is authorised to view based upon the verified license of the individual;
   combining the predetermined portion of the primary content, the first predetermined portion of the secondary content, and the predetermined portion of the secondary content to form combined content for transmittal to the electronic device and rendering to the individual;
   generating a unique fingerprint for the combined content and embedding the unique fingerprint within the combined content to form fingerprinted combined content from the license of the individual and at least one of the predetermined portion of the primary content, the first predetermined portion of the secondary content, the second predetermined portion of the secondary content, and the combined content;
   encrypting the fingerprinted combined content for transmission to the electronic device; and
   transmitting the encrypted fingerprinted combined content to the electronic device for rendering by the second software application to the user of the plurality of users;
   the primary content and the secondary content are maintained as separate elements of electronic content within the first memory; and
   a size of the predetermined portion of the primary content and therein each of the first predetermined portion of the secondary content and the predetermined portion of the secondary content associated with the predetermined portion of the primary content that are retrieved, combined, encrypted and transmitted is determined in dependence upon a factor relating to the electronic device associated with the individual and their viewing a previously received another portion of the primary content; wherein
   the first software application sequentially performs the steps of retrieving a predetermined portion of the primary content and a predetermined portion of the secondary content from the first memory and combining them to form combined content for rendering to the individual in dependence upon sequential requests for additional content from a remote electronic device coupled to the communications network, wherein
   either the predetermined portion of the primary content is peer-to-N-peer downloaded from the plurality of servers or each predetermined portion of the primary content associated with each sequential request is peer-to-N-peer downloaded from the plurality of servers; and
   each predetermined portion of the primary content is uniquely fingerprinted with the identity of the source as well as a license associated with the individual requesting the content.

2. The system according to claim 1, wherein
   the factor relating to the electronic device is an aspect of the user's scrolling comprising at least one of a speed of motion of a finger of the individual upon a touch sensitive interface forming part of the electronic device and multiple repeated scrolling motions by the individual with respect to the touch sensitive interface.

3. The system according to claim 1, wherein
   the factor relating to the electronic device is selected from the group comprising a characteristic of a display forming part of the electronic device, a characteristic of the other portion of the primary content in a direction of scrolling undertaken by the individual within the other portion of the primary content, and a data rate of electronic communications between the electronic device and the plurality of servers.

4. The system according to claim 1, wherein
the second software provides the user multiple modes of rendering such that:
   in a first mode of rendering only the predetermined portion of the primary content is rendered to the user;
   in a second mode of rendering the predetermined portion of the primary content and the first predetermined portion of the secondary content are rendered to the user such that the user can visually distinguish the predetermined portion of the primary content from the first predetermined portion of the secondary content; and
   in a third mode of rendering the predetermined portion of the primary content, the first predetermined portion of the secondary content, and the second predetermined portion of the secondary content are rendered to the user such that the user can visually distinguish the predetermined portion of the primary content from the first predetermined portion of the secondary content and the second predetermined portion of the secondary content; and
   in a fourth mode at least one of the first predetermined portion of the secondary content and the second predetermined portion of the secondary content are rendered to overlay a specific portion of the predetermined portion of the primary content.

5. The system according to claim 1, wherein
the secondary content is crowd-sourced from those users of the plurality of users having a license to the primary content.

6. The system according to claim 1, wherein
the first software application further executes a first process comprising the step of generating a primary content search index for the primary content comprising word occurrences within the primary content cross-referenced to their locations within the primary content;
the first software application further executes a second process comprising the step of generating a secondary content search index comprising word occurrences within the secondary content cross-referenced to their locations within the secondary content and associating with each occurrence any class of secondary content associated with the secondary content item within which that specific occurrence occurs;
the first software application transmits the primary content search index and secondary content search index to the electronic device of the user of the plurality of users; and
the second software application includes a search process allowing the user to perform a search within both the primary content search index and the secondary content search index, select an identified search result, and where the identified search result is outside the current combined content within the second software application to generate a request to the first software application to retrieve the appropriate portions of the primary content and secondary content.

7. The system according to claim 1, further comprising
associating a class of secondary content with each secondary content item; wherein
   the class is selected from the group comprising private, public, team, project and enterprise; and
   the license of the individual permits them to access secondary content generated by a plurality of generating users in dependence upon the classes of secondary content associated with their license.

8. The system according to claim 1, wherein
secondary content added by a user is assigned a class of a plurality of classes, each class of the plurality of classes providing different access rights to the secondary content for other users within the plurality of users; and
the secondary content combined with the primary content to form the combined content includes all secondary content assigned to those classes for which the individual has permission rights based upon their license.

9. The system according to claim 1, wherein
the first software application receives new primary content replacing the primary content currently stored in memory;
upon a subsequent verification of the license of the user the first software application determines whether the license of the user permits access to the new primary content; and
upon a successful determination the first software application executes a process comprising the steps:
   extracting an item of the plurality of second content items forming the secondary content and its associated data relating to its specific location with the old primary content and correlating the associated data with the new primary content;
   determining whether the correlation exceeds a predetermined threshold; wherein
      upon the correlation exceeding the predetermined threshold the first software application automatically associates that item of the plurality of second content items with the new primary content by updating the data relating to the specific location within the primary content; and
      upon the correlation not exceeding the predetermined threshold the first software application obtains a best guess for an updated location within the new primary content and presents this to the individual and provides the individual with the option to either accept the best guess, enter a new location, or delete the item, wherein after the option selected is completed the first software application updates the data relating to the specific location within the primary content with that established through the option selected by the individual; and
   proceeding to the next item of the plurality of second content items until all second content items have been processed.

10. The system according to claim 1, wherein
the first software application receives at least one new release of a plurality of releases, each release replacing the primary content currently stored in memory; and
upon receipt the at least one new release of the plurality of releases the first software application executes a process which re-associates the secondary content to the new release of the primary content; wherein
the original primary content and at least one of the new release of the plurality of releases and any prior new releases of the plurality of releases are stored within the memory; and
the second software application provides the individual with the ability to navigate sequentially through all releases of the primary content and be presented with both the primary content of a specific release and the secondary content associated with the primary content for that specific release.

11. The system according to claim 1, wherein
each item of the plurality of second content items has a class associated with it selected from the group comprising private, public, team, project and enterprise; and
the first software application retrieves those second content items having a class defining private to the user prior to either retrieving those second content items having other classes or presenting the user with an option to select other classes and retrieving those second content items having classes selected by the user.

12. The system according to claim 1, wherein
the first software application upon receiving a new request for verification of the user determines whether there is new priority secondary content relating to the primary content; wherein
upon a positive determination the first software application proceeds to extract the new priority secondary content and its associated primary content for merging, transmitting and rendering to the user and provides the user with options to generate a response comment to the new priority secondary content, accept the new priority secondary content and dismiss the new priority secondary content; and
when the user accepts or dismisses the new priority secondary content the decision and time/date information relating to the time of the decision are stored in association with new priority secondary content.

13. The system according to claim 1, wherein
the first software application upon receiving a new request for verification of the user determines whether there is new priority secondary content relating to any primary content to which the user has a license with an associated class of secondary content to which the user's license permits access; wherein
upon a positive determination the first software application proceeds to extract the new priority secondary content and its associated primary content for merging, transmitting and rendering to the user prior to any activity relating to the primary content to which the license being verified relates and provides the user with options in respect of the new priority secondary content; and
when the user accepts or dismisses the new priority secondary content the decision and time/date information relating to the time of the decision are stored in association with new priority secondary content.

14. The system according to claim 1, wherein
the first software application upon receiving a new request for verification of the user presents the user with one or more filter options relating to filtering the secondary content; wherein
the one or more filter options are selected from the group comprising an identity of the user generating, a time of generation, a keyword within, and a format of the second content item.

15. The system according to claim 1, wherein
a second content item is a link to an external webpage; wherein
the external webpage is accessed upon selection of the second content item; and
the external webpage is at least one of a blog, micro-blog, a bulletin board, a discussion forum.

16. The system according to claim 1, wherein
the first software application upon accessing the publication within a new session established by the individual executes a process comprising the steps of:
determining whether new priority secondary content associated with the publication has been added since the individual last accessed the publication;
notifying the individual of the new priority secondary content upon a positive determination and prompting the individual with respect to viewing the new priority secondary content;
displaying the new priority secondary content and its associated primary content upon a response from the individual to view the new priority secondary content;
storing an indication as to whether the new priority secondary content was viewed by the individual or not;
determining whether the individual can provide a response to not view the new priority secondary content; wherein
the new priority secondary content may be rendered to the user either with or without its associated primary content; and
the determination of whether new priority secondary content associated with the publication has been added is made prior to the individual making a selection with respect to accessing the publication.

17. A system comprising:
a plurality of servers connected to a communications network comprising at least a first processor for executing a first software application and a first memory for storing:
the first software application;
primary content relating to a publication which cannot be accessed directly or modified by any user of a plurality of users executing a second software upon an electronic device to render at least the primary content to the user of a plurality of users;
secondary content relating to the publication but not forming part of the publication; the second content comprising a plurality of secondary content items, each secondary content item generated by a user of a plurality of users in response to viewing the primary content within the second software application upon the electronic device and associated by the user of the plurality of users with a specific location within the primary content; and
a database comprising licensing data relating to the primary content, the secondary content, and the plurality of users; wherein
the first software application in response to a request received from an electronic device associated with an individual via the communications network performs the steps of:
verifying a license of the individual in dependence upon license data received from the electronic device as part of the request and the licensing data, the license relating to permission to view the rendered combined primary content and the secondary content of the individual and a predetermined subset of the plurality of users; and
upon verifying the license of the individual the first software application performs the additional steps of:

retrieving a predetermined portion of the primary content to which the individual is authorised in dependence upon at least their verified license;

retrieving a first predetermined portion of the secondary content, the first predetermined portion of the secondary content being that associated with the retrieved predetermined portion of the primary content generated by the individual;

retrieving a second predetermined portion of the secondary content, the second predetermined portion of the secondary content being that added by a predetermined subset of the plurality of users whose secondary content the individual is authorised to view based upon the verified license of the individual;

combining the predetermined portion of the primary content, the first predetermined portion of the secondary content, and the predetermined portion of the secondary content to form combined content for transmittal to the electronic device and rendering to the individual;

generating a unique fingerprint for the combined content and embedding the unique fingerprint within the combined content to form fingerprinted combined content from the license of the individual and at least one of the predetermined portion of the primary content, the first predetermined portion of the secondary content, the second predetermined portion of the secondary content, and the combined content;

encrypting the fingerprinted combined content for transmission to the electronic device; and transmitting the encrypted fingerprinted combined content to the electronic device for rendering by the second software application to the user of the plurality of users;

the primary content and the secondary content are maintained as separate elements of electronic content within the first memory; and a size of the predetermined portion of the primary content and therein each of the first predetermined portion of the secondary content and the predetermined portion of the secondary content associated with the predetermined portion of the primary content that are retrieved, combined, encrypted and transmitted is determined in dependence upon a factor relating to the electronic device associated with the individual and their viewing a previously received another portion of the primary content; wherein the first software application sequentially performs the steps of retrieving predetermined portions of the primary content and the secondary content from the first memory to combine and generate new combined content for rendering to the user in dependence upon requests for additional content from a remote electronic device coupled to the communications network, wherein in dependence upon the factor relating to the electronic device associated with the individual and their viewing a previously received another portion of the primary content the first software application adjusts the process to provide at least one of:

automatic migration to displaying only a hierarchy of the primary content to ease navigation through the primary content; and automatic migration of a scroll bar presented to the individual from a linear context to a non-linear context according to an increased at least one of speed and distance of user scroll actions, wherein the non-linear context is selected from the group comprising by page, by sub-section, by section, and by chapter and which of the group is established in dependence upon a magnitude of the speed or distance of the user scroll actions.

18. A system comprising:

a plurality of servers connected to a communications network comprising at least a first processor for executing a first software application and a first memory for storing:

the first software application;

primary content relating to a publication which cannot be accessed directly or modified by any user of a plurality of users executing a second software upon an electronic device to render at least the primary content to the user of a plurality of users;

secondary content relating to the publication but not forming part of the publication; the second content comprising a plurality of secondary content items, each secondary content item generated by a user of a plurality of users in response to viewing the primary content within the second software application upon the electronic device and associated by the user of the plurality of users with a specific location within the primary content; and a database comprising licensing data relating to the primary content, the secondary content, and the plurality of users; wherein the first software application in response to a request received from an electronic device associated with an individual via the communications network performs the steps of:

verifying a license of the individual in dependence upon license data received from the electronic device as part of the request and the licensing data, the license relating to permission to view the rendered combined primary content and the secondary content of the individual and a predetermined subset of the plurality of users; and upon verifying the license of the individual the first software application performs the additional steps of:

retrieving a predetermined portion of the primary content to which the individual is authorised in dependence upon at least their verified license;

retrieving a first predetermined portion of the secondary content, the first predetermined portion of the secondary content being that associated with the retrieved predetermined portion of the primary content generated by the individual;

retrieving a second predetermined portion of the secondary content, the second predetermined portion of the secondary content being that added by a predetermined subset of the plurality of users whose secondary content the individual is authorised to view based upon the verified license of the individual;

combining the predetermined portion of the primary content, the first predetermined portion of the secondary content, and the predetermined portion of the secondary content to form combined content for transmittal to the electronic device and rendering to the individual;

generating a unique fingerprint for the combined content and embedding the unique fingerprint within the combined content to form fingerprinted combined content from the license of the individual and at least one of the predetermined portion of the primary content, the first predetermined portion of the secondary content, the second predetermined portion of the secondary content, and the combined content;

encrypting the fingerprinted combined content for transmission to the electronic device; and transmitting the encrypted fingerprinted combined content to the electronic device for rendering by the second software application to the user of the plurality of users;

the primary content and the secondary content are maintained as separate elements of electronic content within the first memory; and a size of the predetermined portion of the primary content and therein each of the first predetermined portion of the secondary content and the predetermined portion of the secondary content associated with the predetermined portion of the primary content that are retrieved, combined, encrypted and transmitted is determined in dependence upon a factor relating to the electronic device associated with the individual and their viewing a previously received another portion of the primary content; wherein retrieving a second predetermined portion of the secondary content comprises the steps of:
  determining whether there are a plurality of classes of secondary content to which the individual has access based upon their verified license;
  upon a positive determination presenting to the individual a listing of the plurality of classes of secondary content to which they have access;
  receiving one or more selections from the individual relating to which classes of secondary content to which they have access that they wish to view; and
  the second predetermined portion of the secondary content is established in dependence upon the classes of secondary content the individual wishes to view and the secondary content the individual is authorised to view based upon the verified license of the individual.

\* \* \* \* \*